US011036832B2

(12) United States Patent
Shehata et al.

(10) Patent No.: US 11,036,832 B2
(45) Date of Patent: *Jun. 15, 2021

(54) INTEGRATED CIRCUIT IDENTIFICATION

(71) Applicant: International Business Machines Corporation, Armonk, NY (US)

(72) Inventors: Andrea Bahgat Shehata, White Plains, NY (US); Peilin Song, Lagrangeville, NY (US); Franco Stellari, Waldwick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/683,368

(22) Filed: Nov. 14, 2019

(65) Prior Publication Data
US 2020/0082053 A1    Mar. 12, 2020

Related U.S. Application Data

(63) Continuation of application No. 15/591,691, filed on May 10, 2017, now Pat. No. 10,515,181, and a
(Continued)

(51) Int. Cl.
*G06F 21/14* (2013.01)
*G06F 30/398* (2020.01)
(Continued)

(52) U.S. Cl.
CPC ............ *G06F 21/14* (2013.01); *G06F 30/398* (2020.01); *G06F 30/00* (2020.01); *G06F 30/30* (2020.01)

(58) Field of Classification Search
CPC .......... G06F 21/14; G06F 30/00; G06F 30/30; G06F 30/398; G06F 30/3323
See application file for complete search history.

(56) References Cited

U.S. PATENT DOCUMENTS

| 5,781,447 A | 7/1998 | Gerdes | |
|---|---|---|---|
| 6,434,704 B1 * | 8/2002 | Dean | ...................... G06F 30/30 713/320 |

(Continued)

FOREIGN PATENT DOCUMENTS

| CA | 2 284 949 A1 | 4/2001 |
|---|---|---|
| FR | 2 650 092 A1 | 1/1991 |

OTHER PUBLICATIONS

Torrance, "The State-of-the-Art in Semiconductor Reverse Engineering at Chipworks", Chipworks, Sep. 9, 2009, 72 pages.
(Continued)

*Primary Examiner* — Helen Rossoshek
(74) *Attorney, Agent, or Firm* — Amin, Turocy & Watson, LLP

(57) ABSTRACT

Techniques facilitating integrated circuit identification and reverse engineering are provided. A computer-implemented method can comprise identifying, by a system operatively coupled to a processor, an element within a first elementary cell of one or more elementary cells of an integrated circuit. The method can also comprise matching, by the system, the element with respective elements across the one or more elementary cells including the first elementary cell. The respective elements can be replicas of the element. Further, matching the element with respective elements can be based on a layout analysis of the integrated circuit.

20 Claims, 21 Drawing Sheets

Related U.S. Application Data continuation of application No. 15/842,639, filed on Dec. 14, 2017, now Pat. No. 10,515,183.

(51) Int. Cl.
*G06F 30/00* (2020.01)
*G06F 30/30* (2020.01)

(56) References Cited

U.S. PATENT DOCUMENTS

| | | | |
|---|---|---|---|
| 6,496,022 B1 | 12/2002 | Kash et al. | |
| 6,536,018 B1 | 3/2003 | Chisholm et al. | |
| 6,536,024 B1* | 3/2003 | Hathaway | G06F 1/10 |
| | | | 327/295 |
| 6,907,583 B2 | 6/2005 | Abt et al. | |
| 6,954,908 B2* | 10/2005 | Subasic | G06F 30/3323 |
| | | | 716/101 |
| 7,509,601 B2 | 3/2009 | Skoll et al. | |
| 7,596,736 B2 | 9/2009 | Kassab et al. | |
| 7,689,954 B2 | 3/2010 | Zhang et al. | |
| 7,707,526 B2 | 4/2010 | Su et al. | |
| 7,783,994 B2 | 8/2010 | Ball et al. | |
| 7,937,678 B2 | 5/2011 | Lippmann et al. | |
| 7,954,072 B2 | 5/2011 | Liu et al. | |
| 8,141,016 B2 | 3/2012 | Correale, Jr. et al. | |
| 8,176,448 B2 | 5/2012 | Koushanfar | |
| 8,307,317 B2 | 11/2012 | Adams et al. | |
| 8,464,191 B2 | 6/2013 | McIlrath | |
| 8,635,582 B2 | 1/2014 | Stellari et al. | |
| 8,701,058 B2 | 4/2014 | Zavadsky et al. | |
| 8,723,795 B2 | 5/2014 | Underkoffler et al. | |
| 8,850,380 B2* | 9/2014 | Bickford | G06F 30/39 |
| | | | 716/136 |
| 8,910,089 B1* | 12/2014 | Barai | G03F 7/70516 |
| | | | 716/51 |
| 8,918,753 B2* | 12/2014 | Akar | G11C 29/56008 |
| | | | 716/136 |
| 8,972,917 B1* | 3/2015 | Lu | G06F 30/367 |
| | | | 716/112 |
| 9,483,584 B2* | 11/2016 | Batra | G06F 30/00 |
| 10,354,043 B2 | 7/2019 | Clark et al. | |
| 10,515,181 B2 | 12/2019 | Shehata et al. | |
| 10,515,183 B2 | 12/2019 | Shehata et al. | |
| 2005/0257186 A1* | 11/2005 | Zilbershlag | G06F 30/34 |
| | | | 716/102 |
| 2007/0174797 A1* | 7/2007 | Luo | G05B 19/41875 |
| | | | 716/56 |
| 2009/0254572 A1 | 10/2009 | Redlich et al. | |
| 2014/0126306 A1 | 5/2014 | Otterstedt et al. | |
| 2014/0380259 A1 | 12/2014 | Tuan | |
| 2015/0008957 A1 | 1/2015 | Olgiati et al. | |
| 2015/0089464 A1 | 3/2015 | Lu | |
| 2015/0227667 A1* | 8/2015 | Liu | H05K 3/0005 |
| | | | 174/250 |
| 2017/0316138 A1 | 11/2017 | Chiang et al. | |
| 2018/0268081 A1 | 9/2018 | Kearney | |
| 2020/0082053 A1 | 3/2020 | Shehata et al. | |
| 2020/0082054 A1* | 3/2020 | Shehata | G06F 30/398 |

OTHER PUBLICATIONS

Quadir et al., "A Survey on Chip to System Reverse Engineering," Journal on Emerging Technologies in Computing Systems, Apr. 2016, vol. 13, No. 1, ACM, 34 pages.

"Congestion Mitigation by Congestion Optimized Library Cell Swapping and Selective Standard Cell Repulsion", URL: http://ip.com/IPCOM/000221143D, Aug. 30, 2012, 10 pages.

"Method to Implement a Nonfunctional Transistor and Device to Prevent IC Reverse Engineering and Counterfeiting", URL: http://ip.com/IPCOM/000231099D, Sep. 26, 2013, 5 pages.

List of IBM Patents or Applications to be treated as related.

Non-Final Office Action received for U.S. Appl. No. 15/591,691 dated Oct. 10, 2018, 40 pages.

Final Office Action received for U.S. Appl. No. 15/591,691 dated Mar. 4, 2019, 19 pages.

Wu et al., "TPAD: Hardware Trojan Prevention and Detection for Trusted Integrated Circuits", IEEE, 2015, pp. 1-14.

Non-Final Office Action received for U.S. Appl. No. 15/842,639 dated May 13, 2019, 23 pages.

Non-Final Office Action received for U.S. Appl. No. 15/591,691 dated Jun. 27, 2019, 17 pages.

Notice of Allowance received for U.S. Appl. No. 15/591,691 dated Aug. 14, 2019, 19 pages.

Non-Final Office Action received for U.S. Appl. No. 16/684,064 dated Oct. 19, 2020, 42 pages.

Office Action received for U.S. Appl. No. 16/684,064 dated Feb. 19, 2021, 17 pages.

* cited by examiner

INTEGRATED CIRCUIT IDENTIFICATION

STATEMENT REGARDING FEDERALLY SPONSORED RESEARCH OR DEVELOPMENT

This invention was made with Government support under Contract No.: H98230-12-C-0325 TTO #12 awarded by the National Security Agency. The Government has certain rights in this invention.

BACKGROUND

The subject disclosure relates to integrated circuit identification, and more specifically, integrated circuit identification and reverse engineering.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate integrated circuit identification and reverse engineering are described.

According to an embodiment, a computer-implemented method can comprise identifying, by a system operatively coupled to a processor, an element within a first elementary cell of one or more elementary cells of an integrated circuit. The method can also comprise matching, by the system, the element with respective elements across the one or more elementary cells including the first elementary cell. The respective elements can be replicas of the element. Further, matching the element with the respective elements can be based on a layout analysis of the integrated circuit.

According to an embodiment, a system can comprise a memory that stores computer executable components and a processor that executes computer executable components stored in the memory. The computer executable components can comprise a reconstruction component that identifies an element within a first elementary cell of one or more elementary cells of an integrated circuit. The computer executable components can also comprise a matching component that determines respective replicas of the element across the one or more elementary cells including the first elementary cell based on a topological evaluation of the integrated circuit.

According to another embodiment, a computer program product facilitating chip identification is provided. The computer program product can comprise a computer readable storage medium having program instructions embodied therewith, the program instructions executable by a processing component to cause the processing component to: divide an integrated circuit into one or more elementary cells based on topological characteristic of the integrated circuit; identify an element within a first elementary cell of the one or more elementary cells; and match the element with respective elements across the one or more elementary cells including the first elementary cell based on a layout analysis of the integrated circuit, wherein the respective elements are replicas of the element.

DETAILED DESCRIPTION

Figure 1:
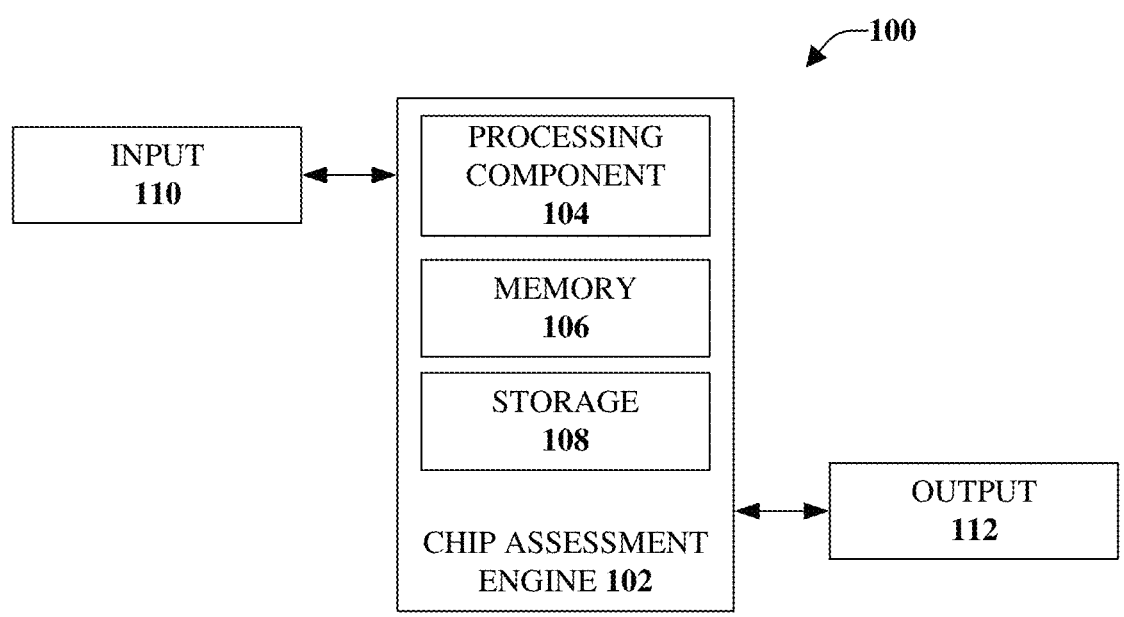
FIG. 1 illustrates a block diagram of an example, non-limiting system that facilitates integrated circuit identification in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The various aspects discussed herein relate to integrated circuit identification and reverse engineering. Specifically, one or more of the various aspects can enable integrated circuit identification and reverse engineering through pattern analysis and inspection of integrated circuit layouts without damaging the hardware and without the use of emission tools. According to one or more aspects provided herein, the hardware is not damaged because the integrated circuits are not de-layered and, therefore, the hardware can remain functional. However, it should be noted that if a layout is not available, in order to extract the polygons/gates for the analysis, a destructive delayers can be utilized in some embodiments. As used herein, "integrated circuits" are referred to as "chips" (and vice versa).

Protecting and securing circuit designs and integrated circuits against adversary attacks is desirable in today's environment where more and more chips are being manufactured by unsecure foundries. In order to provide security as it relates to intelligence information collection of legal rights related to circuit design, it can be useful to have a strong workflow to identify similarities between chips, associate multiple chips to the same designer or design house, identify reuse of exiting IP blocks, or otherwise identify a chip design.

The one or more aspects provided herein relate to the context of chip security. For example, contents of a chip can be analyzed to determine if the chip contains a significant portion of another chip design. For example, the analysis can be utilized to determine if the chip being analyzed comprises protectable IP components of another chip. In another example, the analysis can be utilized to determine if the chip being analyzed has been prepared based on copying a design of another chip that was developed in a secure manufacturing environment (e.g., copying by an entity unauthorized to copy the chip). For example, a comparison can be performed to compare the design of the chip being analyzed against one or more known designs to determine unauthorized copying and/or misappropriation of the known designs. Thus, according to various aspects provided herein, evaluation of a chip can include at least partially dividing the chip design into subcomponents and reconstructing or reverse engineering the subcomponents. Further, based on the reverse engineering, a gate-level mapping sequence of the design being analyzed can be created and compared to a signature of another design (e.g., a known design) to identify commonalities and differences. The mapping sequence can be similar to a deoxyribonucleic acid (DNA) sequence utilized for genetics. According to some implementations, public information can be utilized to gather information about a design.

Within this detailed disclosure, certain embodiments will be described based on the assumption that certain levels (for example up to Metal one (M1)) are available via a layout file (such as a Graphic Database System (GDSII) or Open Artwork System Interchange Standard (OASIS) file). However, it should be understood that these layers could also be derived from the physical reverse engineering of an actual chip.

FIG. 1 illustrates a block diagram of an example, non-limiting system 100 that facilitates chip identification in accordance with one or more embodiments described herein. Aspects of systems (e.g., non-limiting system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, non-limiting system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise non-limiting system 100 can include tablet computing devices, handheld devices, server class computing machines and/or databases, laptop computers, notebook computers, desktop computers, cell phones, smart phones, consumer appliances and/or instrumentation, industrial and/ or commercial devices, hand-held devices, digital assistants, multimedia Internet enabled phones, multimedia players, and the like.

As illustrated, non-limiting system 100 can comprise a chip assessment engine 102, a processing component 104, a memory 106, and/or a storage 108. In some embodiments, one or more of the chip assessment engine 102, the processing component 104, the memory 106, and/or the storage 108 can be communicatively and/or operatively coupled to one another to perform one or more functions of the non-limiting system 100.

In various embodiments, the chip assessment engine 102 can receive as input 110 a layout database (e.g., based on information provided by a designer or by a device associated with a designer or by a device configured with functionality to generate information for a design) that comprises information related to respective layouts and designs of known chips (e.g., the chips being protected). According to some implementations, the chip assessment engine 102 can receive as input 110 various details related to the one or more known chips. For example, the details can be received from chip libraries, historical information related to previous chips analyzed, published chip literature, and/or data related to other chips manufactured at the same location (or a related location).

Additionally or alternatively, the chip assessment engine 102 can receive as input 110 polygons from reverse engineering or that are collected from physical analysis of a chip. The physical analysis can be obtained through various techniques such as a Scanning Electron Microscope (SEM), a Transmission Electron Microscope (TEM), and/or Xray images, which allow extraction of the polygons of the chip.

In accordance with an embodiment, the chip assessment engine 102 upon or after receiving the input 110 can have access to a flattened layout of at least one chip (e.g., an unidentified chip, a chip under consideration). A flattened layout is a layout without labels (e.g., names have not been associated with gates of the target chip, there is no hierarchical information associated with the target chip).

The chip assessment engine 102 can identify large functional blocks within the flattened layout. Further, the chip assessment engine 102 can separate the large functional blocks into leaf cells (e.g., elementary pieces). For example, the chip assessment engine 102 can perform the separation through utilization of proximity, spacing, filler gates, and other feature of the chip. Further details related to this will be provided below with respect to FIG. 5. The chip assessment engine 102 can reverse engineer the leaf cells and associate meaningful labels to components within the leaf cells (e.g., NOR1, AND2, and so on). Accordingly, the chip assessment engine 102 breaks down the flattened layout to reconstruct some hierarchy and components of the layout.

As a result of the reverse engineering, the chip assessment engine 102 can find similar cells in the layout. For example, the chip assessment engine 102 can leverage feature matching based on a CA constellation, which is a relative position of the CA contacts, where the CA is a level of the chip. Thus, the chip assessment engine 102 can identify copies of, for example, the same gate within the chip. In this manner, the layout can be broken down into manageable pieces and the manageable pieces can be compared to other portions of the chip.

Accordingly, at this point, an output 112 can be a gate level reverse engineering determination. For example, the chip assessment engine 102 can determine (based on the gate level reverse engineering), a list of gates that composes the layout in the chip being analyzed and respective locations of the gates within the layout. It is noted that the list of gates does not necessarily indicate a relationship between the gates (e.g., how the gates are connected). According to an implementation, the gate information can be utilized to compare the extracted information to another chip (e.g., a known chip, an unknown chip) to determine whether or not there is a match between the chips.

According to some implementations, the chip assessment engine 102 can build a gate mapping sequence (e.g., based on the gate list, gate location, number of gates in the layout). The gate mapping sequence can be compared against other mapping sequences from other libraries or historical knowledge of other chips that were previously analyzed (e.g., historical information), chips for which literature is available, or chips manufactured from the same manufacturing plant. Based on the comparison, interferences can be created between chips and one or more outputs 112 can be obtained. The outputs 112 can include identification of a similar design, a similar source, a similar sub-block, and/or circuit alterations. For example, by identifying a similar design, copies developed from known chip(s) can be identified (e.g., protection of IP). In another example, tracking can be achieved where a determination as to the similar source or design house can be made based on an identification of common gates, common structures, and/or common layouts between a known chip from the design house and the chip(s) being analyzed. In an example related to similar sub-blocks, a chip, a microprocessor design, or a complex chip design can be identified based on a section of the chip that comprises similar mapping sequences. In a further example, circuit alterations can be identified based on a comparison between the mapping sequence of the chip and a mapping sequence of the layout. Further details related to the mapping sequence and the correlation matrix will be provided below with respect to FIGS. 9 and 10.

Figure 2:
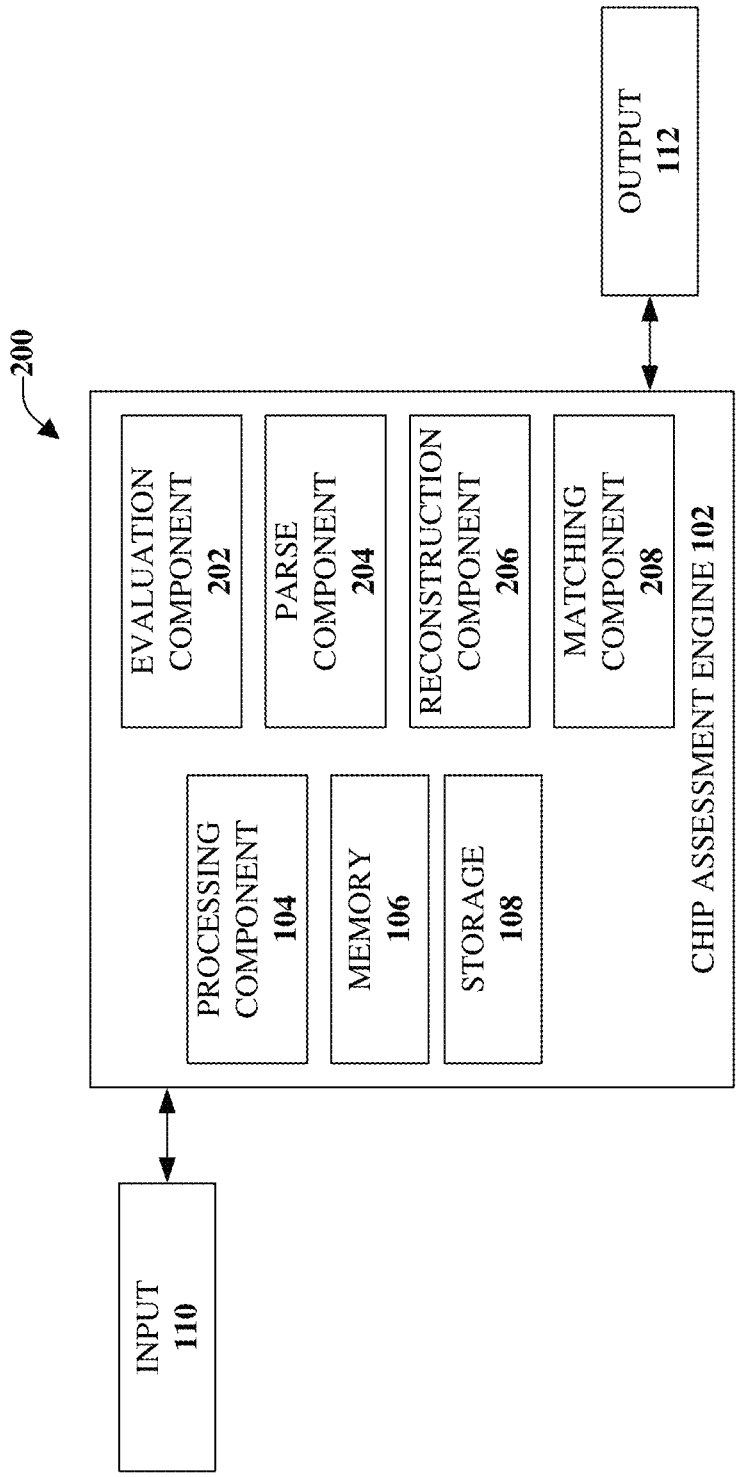
FIG. 2 illustrates a block diagram of an example, non-limiting system that facilitates integrated circuit matching in accordance with one or more embodiments described herein

FIG. 2 illustrates a block diagram of an example, non-limiting system 200 that facilitates chip matching in accordance with one or more embodiments described herein. Repetitive description of like elements employed in other embodiments described herein is omitted for sake of brevity.

The non-limiting system 200 can comprise one or more of the components and/or functionality of non-limiting system 100, and vice versa. As illustrated, the chip assessment engine 102 can include an evaluation component 202, a parse component 204, a reconstruction component 206, and a matching component 208. An input 110 to the evaluation component 202 can be a flattened layout (e.g., no hierarchical structure) without labels (e.g., cell names, macro names, library names, and so on). For example, the flattened layout can be received in a GDSII stream format, which is a database file format used for data exchange of an integrated circuit (IC) artwork and/or an IC layout artwork, although other manners of exchanging data can also be utilized.

Figure 3A:
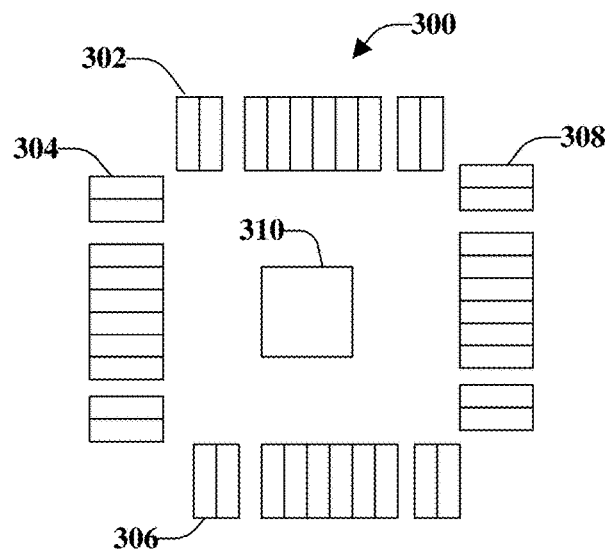
FIG. 3A illustrates an example, non-limiting representation of functional blocks of a circuit layout in accordance with one or more embodiments described herein.

The evaluation component 202 can determine high-level structures within the layout. Examples of high-level structures include, but are not limited to, Input/Output (I/O) devices and memory arrays. With reference also to FIG. 3A, illustrated is an example, non-limiting representation of functional blocks of a circuit layout 300 in accordance with one or more embodiments described herein. In an example, the evaluation component 202 can identify large functional blocks around the periphery of the circuit layout 300. For example, I/O devices can be identified in the circuit layout 300 at a top portion 302, a left side portion 304, a bottom portion 306, and a right side portion 308. Further, synthesized logic 310 within a middle portion of the circuit layout 300 can be identified by the evaluation component 202.

Figure 3B:
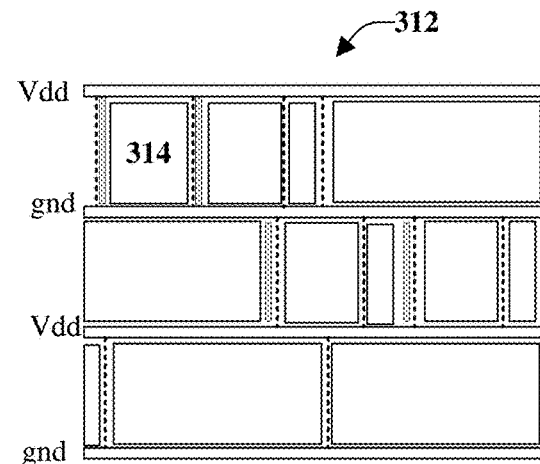
FIG. 3B illustrates an example, non-limiting representation of individual cells of a circuit layer in accordance with one or more embodiments described herein.

The parse component 204 can separate the synthesized logic 310 into blocks, referred to herein as leaf cells or individual cells. For example, the parse component 204 can utilize proximity or adjacency, spacing, and/or filler gates to perform the separation. With reference also to FIG. 3B illustrated is an example, non-limiting representation 312 of individual cells of a circuit layer (e.g., the circuit layer of FIG. 3A) in accordance with one or more embodiments described herein. Further details related to the details of FIG. 3B will be provided below with respect to FIG. 4.

Figure 3C:
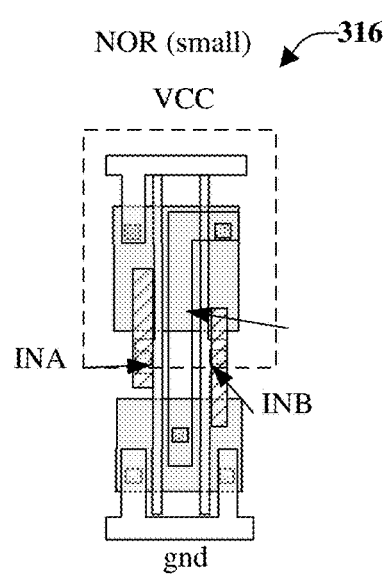
FIG. 3C illustrates a first individual node of FIG. 3B in accordance with one or more embodiments described herein.

With continuing reference to FIG. 2, the individual cells can be reverse-engineered at a gate level by the reconstruction component 206. For example, analysis at the gate level can determine whether the circuit is a NOR Gate, an OR Gate, an AND gate, an inverter, and so on based on the layout. To perform the reverse engineering, the reconstruction component 206 can associate respective meaningful functional labels to the one or more individual cells. For example, a first individual node 314 (illustrated in FIG. 3B) can be evaluated by the reconstruction component 206. In an example, the first individual node 314 can be a NOR Gate 316, as illustrated in FIG. 3C. The NOR Gate 316 comprises labeling, as determined by the reconstruction component 206.

Figure 3D:
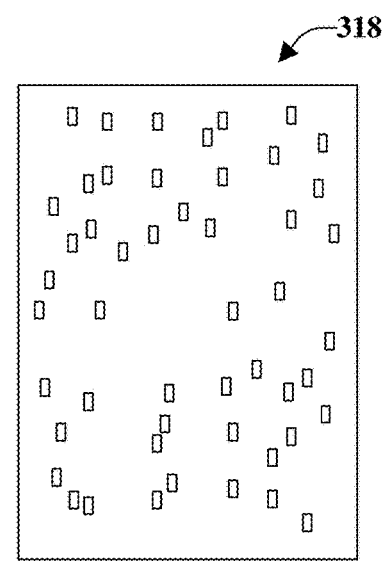
FIG. 3D illustrates an example circuit layout wherein one or more elements that match the individual node of FIG. 3C can be identified within the circuit in accordance with one or more embodiments described herein.

The matching component 208 can determine a quantity of replicas of a defined gate inside a single layout or across multiple layouts. According to an implementation, the matching component 208 can utilize a pattern-matching algorithm to determine the quantity of replicas. For example, upon or after the reconstruction component 206 determines the individual node 314, in this example, is a NOR gate (e.g., the NOR Gate 316 of FIG. 3C), the matching component 208 can discover all the other NOR gates in the layout using feature recognition based on the CA constellation. From the presence of labels and the flattening of the layout structure, an inspection of the layouts to identify high-level structures of interest can be performed. FIG. 3D illustrates an example circuit layout 318 wherein one or more NOR Gates, that matches NOR Gate 316, is identified within the circuit. In the example of FIG. 3D, the NOR Gates are identified by the square boxes.

A variety of different circuit elements can be identified including, for example, chip level I/Os, memories (such as Static Random Access Memory (SRAM) and Rambus Resistive Access Memory (RRAM), for example), and other structures that entail a high level of optimization and organization. Layout inspection, as well as image recognition software can also be used to identify repetitive structures or structures used across multiple designs that could suggest the same origin of the chip. In the first case, the presence of periodicity and repetition of a given structure offers both a clue for its boundary identification in a flattened layout, and a valuable target for an adversary since by reverse engineering a single structure, it is possible to gain a much higher level of understanding of the chip function and behavior. In the second case, being able to group together different chips received at different times can provide a clue into the progressive development of a design. In particular, test chips containing the isolated structure could be reverse engineered more easily, especially if the test chips did not go through the same or similar level of security protection, and are later used to attack the secured design.

Figure 4:
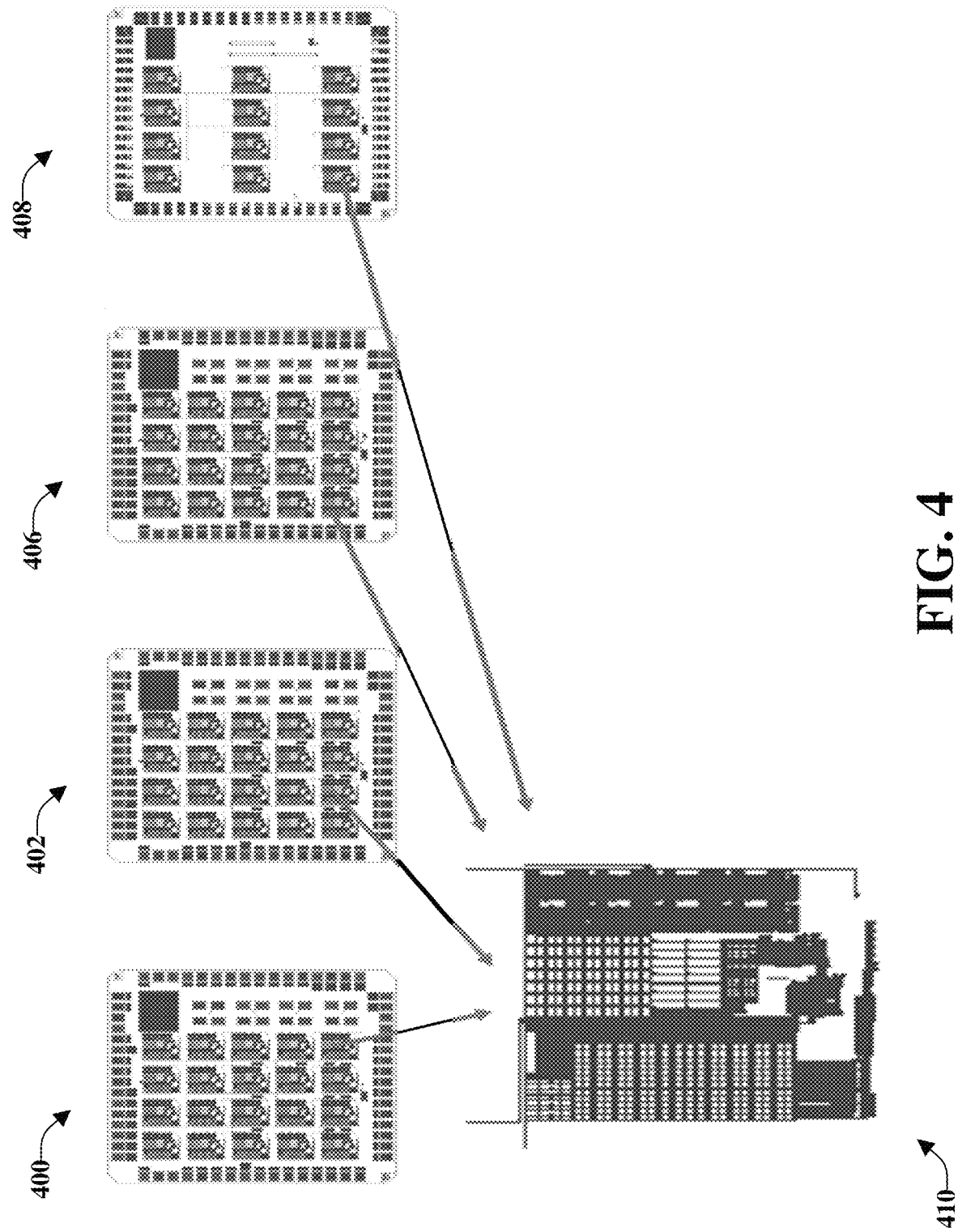
FIG. 4 illustrates example, non-limiting circuits that demonstrate one or more structures repeated multiple times in a given design and across multiple designs in accordance with one or more embodiments described herein.

FIG. 4 illustrates example, non-limiting circuits that demonstrate one or more structures repeated multiple times in a given design and across multiple designs in accordance with one or more embodiments described herein. Illustrated are GDSII files of a first design 402, a second design 404, a third design 406, and a fourth design 408 that comprise structures that are repeated in a fifth design 410 or across multiple designs. As illustrated by the GDSII files, it can be observed that the same structure is repeated multiple times inside one or more of the files and across all of the files. As a hypothetical example, the fourth design 408 can be a simpler test chip version of the chip that could be attacked first. The information and experience gained from the design of fourth design 408 could then be applied to the other designs. Further, particular focus can be placed on attempting to understand the differences in how the blocks are connected and used. Besides identifying the high level structural blocks discussed previously, a skilled adversary would be able to break down a synthesized digital circuit into its elementary components by leveraging the space (or filler) introduced between gates. Accordingly, the various aspects provided herein can provide a high value target for reverse engineering. Further, the disclosed aspects can assist with the isolation and protection of IP blocks.

Figure 5B:
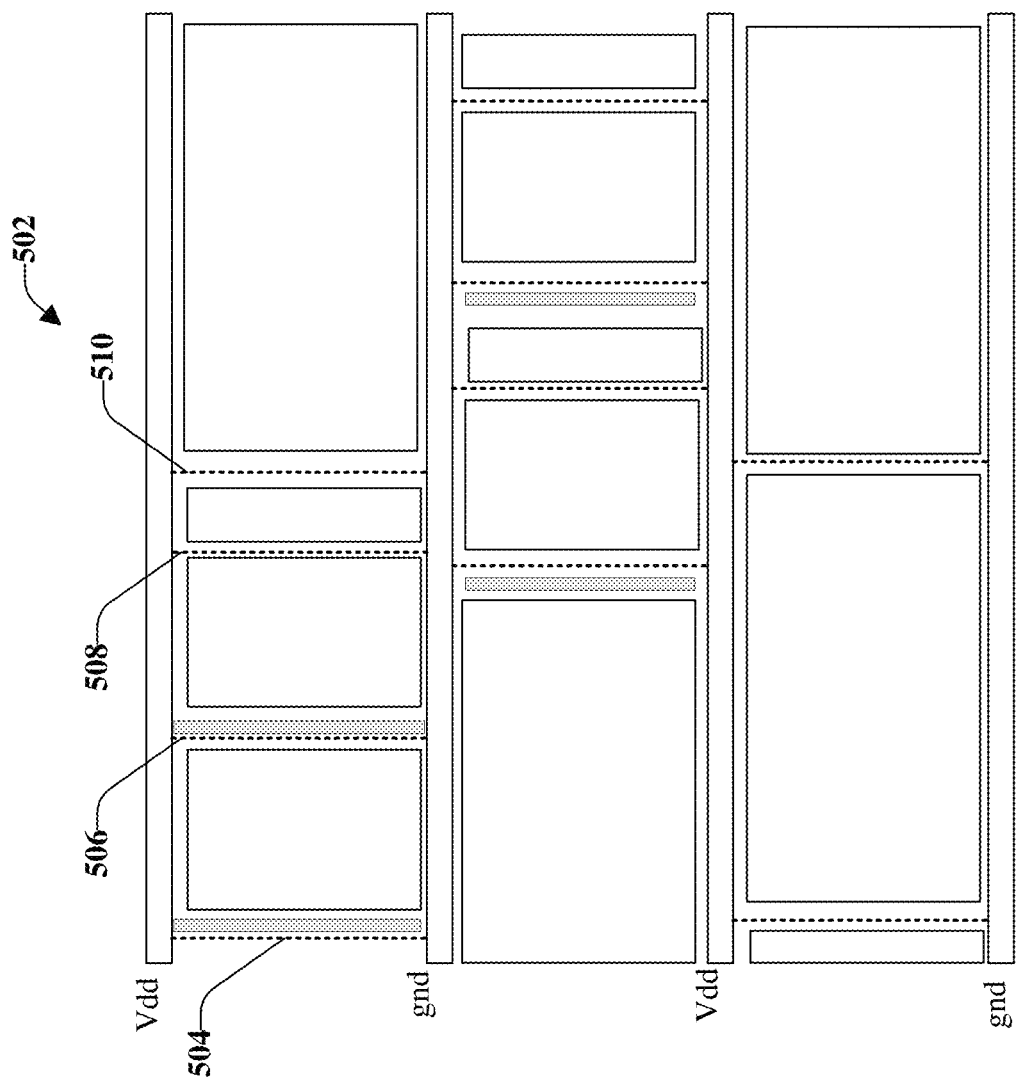
FIG. 5B illustrates the portion of the chip of FIG. 5A as a synthesized circuit in accordance with one or more embodiments described herein.
Figure 5A:
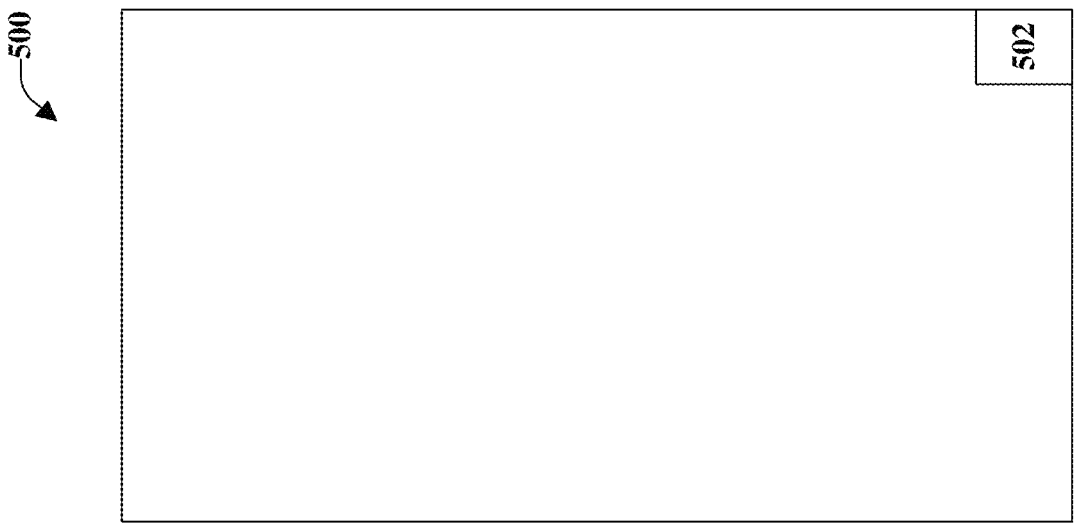
FIG. 5A illustrates an example, non-limiting representation of a target chip under consideration in accordance with one or more embodiments described herein.

FIG. 5A illustrates an example, non-limiting representation of a target chip 500 under consideration in accordance with one or more embodiments described herein. The target chip 500 could be a chip for which analysis is being performed. According to some implementations, the target chip 500 could be a chip that is suspected of copying one or more portions of another chip. As illustrated, during a first phase of analysis (e.g., the analysis discussed above with respect to FIGS. 3A to 3D), a portion 502 of the target chip 500 is selected. FIG. 5B illustrates the portion 502 of the chip that is constructed as a synthesized circuit in accordance with one or more embodiments described herein. The synthesized circuit can be separated into elementary cells (e.g., by the parse component 204) by utilizing a topology of the gate. For example, gates that are separate from one another do not have low level interconnects, such as M1 or PC. Further, different gates usually have some spacing separating the gates.

For example, elementary cells of the synthesized circuit are indicated by the dashed lines, four of which are labeled as dashed lines 504, 506, 508, and 510. Between dashed lines 504 and 506 is an elementary cell (e.g., a first block) that is distinguished by the parse component 204 based on being clearly isolated from the remainder of the circuit on the same row. For example, there is a space and a vertical bar, which are not connected to other elements within the circuit. Accordingly, the parse component 204 can utilize the empty space as an indication of a border of the gate. The elementary cell (e.g., second block) between dashed lines 506 and 508 is slightly more complicated because the spacing is not as large. However, the parse component 204 can still utilize the fact that there are no low level interconnects (e.g., M1 interconnects) between the second block and a third block (e.g., elementary cell) between dashed lines 508 and 510. Thus, there is no M1 connection, no CA connection, and no RX connection, which indicates the two gates (between dashed lines 506 and 510) are not one entity. It is noted that the gates could be connected because they are very close together; however, they are separate entities that can be identified separately. In some examples, a shape can be utilized to distinguish and identify elements of an elementary cell.

It is noted that individual cells can be characterized by a single RX diffusion or by several RX diffusions connected by local PC and M1 levels. Even when additional space is not introduced on purpose, a boundary can usually be identified by noticing a location where there are no RX, PC, and M1 interconnects. Once the cell boundary has been identified, the elementary blocks can be reverse engineered. This process can also be automated through the use of software. Proximity and repetition of a combination of gates can then be used to identify higher-level macros that can be built using elementary blocks. Feature recognition techniques can then be used to identify all the repetitions of a given gate inside a layout or across multiple layouts. In the first case, the statistics and location of the gates can be used to build the gate mapping analysis, while correlations among designs can be used to determine a connection between different layouts. It has been demonstrated that by using only the CA constellation of a given gate, one or more cells of the same type can be uniquely identified. Other layers, such as M1 and RX, do not offer such a unique identifier of a gate. By using a quantitative measure of the matching quality between different gates, a larger library of reverse engineered gates can be built by focusing only on small changes.

Figure 6:
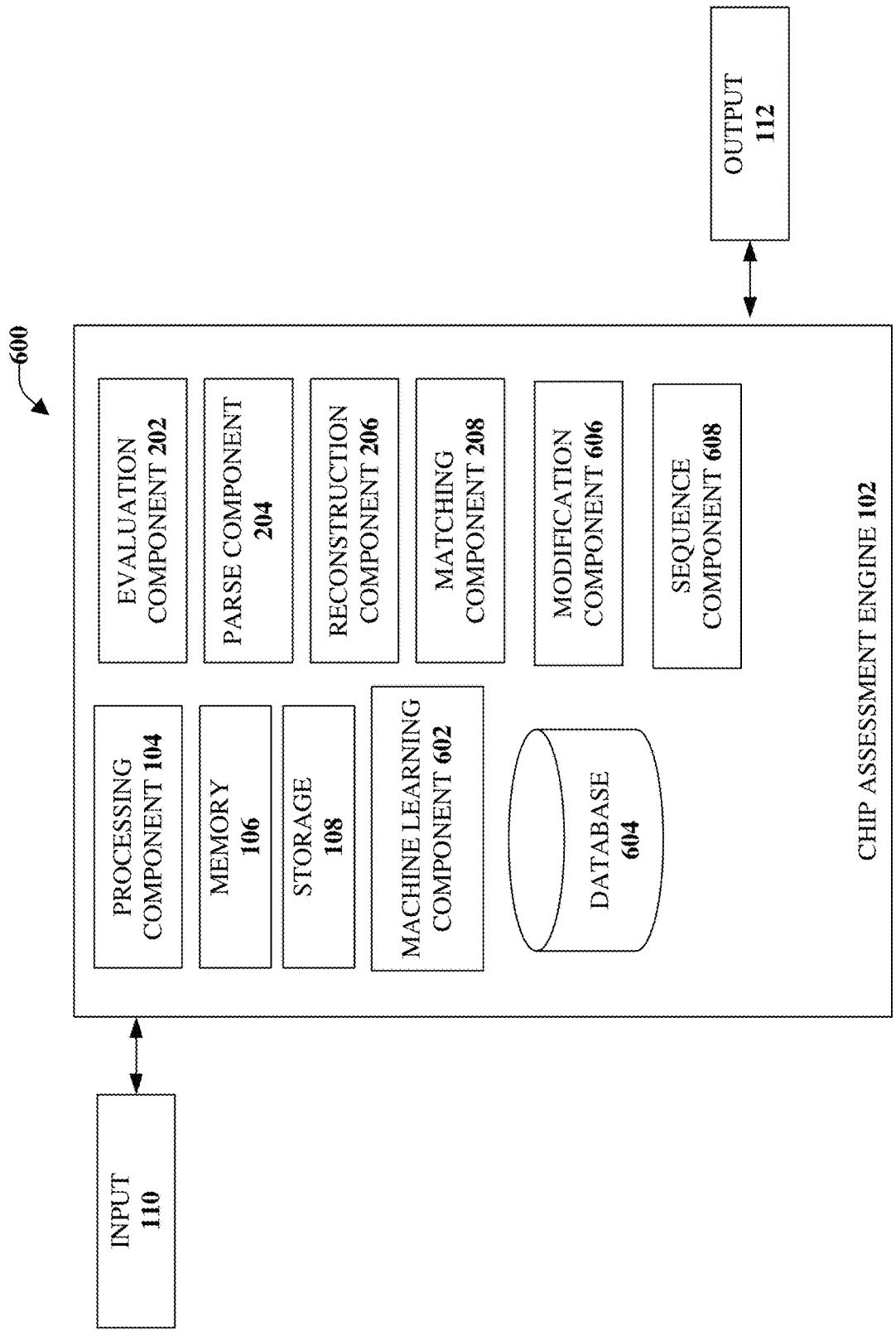
FIG. 6 illustrates a block diagram of an example, non-limiting system that facilitates integrated circuit analysis in accordance with one or more embodiments described herein.

FIG. 6 illustrates a block diagram of an example, non-limiting system 600 that facilitates chip analysis in accordance with one or more embodiments described herein. Repetitive description of like elements employed in other embodiments described herein is omitted for sake of brevity.

The non-limiting system 600 can comprise one or more of the components and/or functionality of non-limiting system 100, non-limiting system 200 and vice versa. As illustrated, the chip assessment engine 102 can include a machine learning component 602, a database 604, a modification component 606, and a sequence component 608.

The machine learning component 602 can perform a set of machine learning computations associated with the input 110 and/or the output 112. In an example, the machine learning component 602 can collect publicly available information from a variety of designs and libraries, which can be utilized to significantly enhance the identification and reverse engineering of the gates.

The machine learning component 602 can utilize machine learning systems that have been explicitly or implicitly trained to learn, determine or infer circuit designs, reduction of a chip into elementary cells, identification of gates within the elementary cells, comparison with other chips, and so on. It is to be appreciated that machine learning systems can be implemented in one or more of the components to generate explicitly and/or implicitly trained models that provide chip identification and reverse engineering as discussed herein.

Figure 7A:
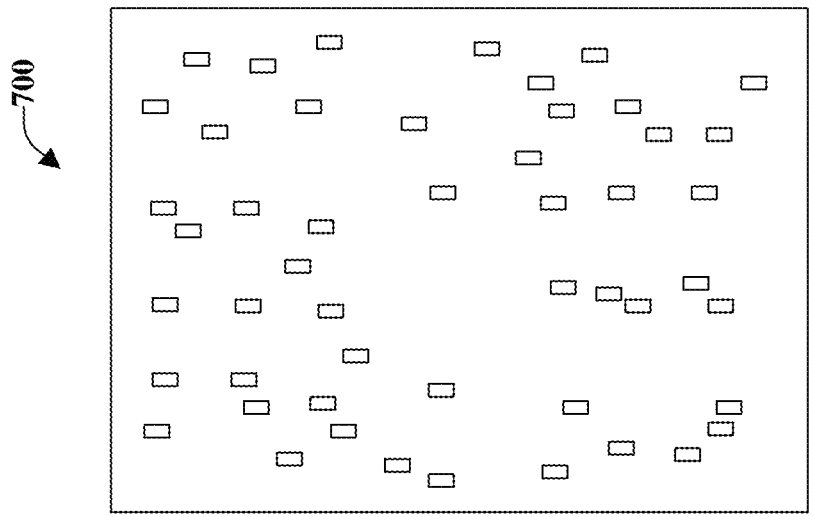
FIG. 7A illustrates an example, non-limiting schematic representation of replicas of a small inverter determined from a matching algorithm in accordance with one or more embodiments described herein.
Figure 7B:
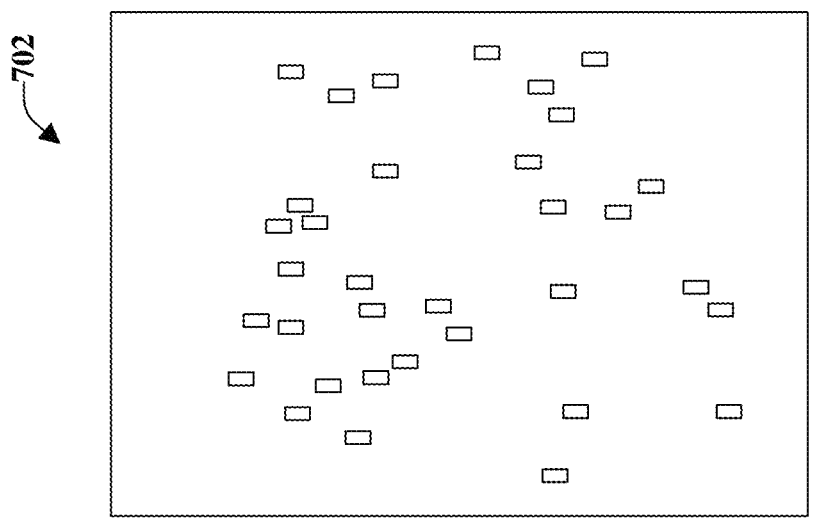
FIG. 7B illustrates an example, non-limiting schematic representation of replicas of a larger NOR gate determined from a matching algorithm in accordance with one or more embodiments described herein.
Figure 7C:
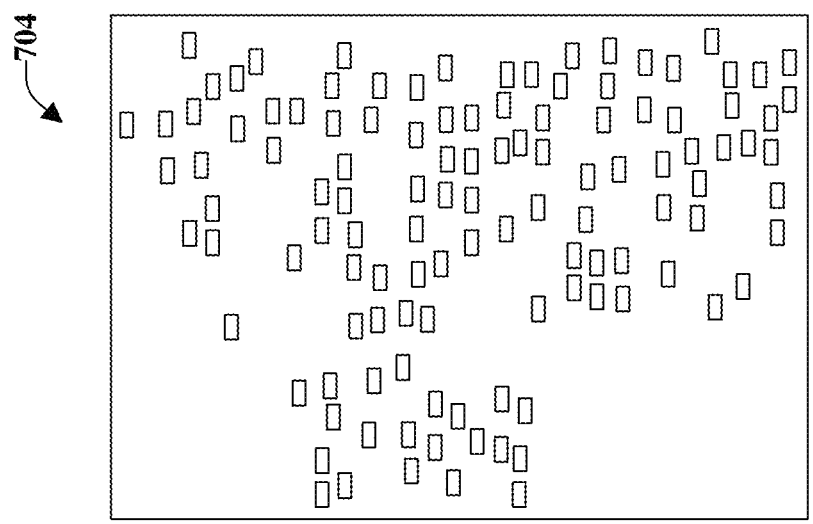
FIG. 7C illustrates an example, non-limiting schematic representation of replicas of a complex macro determined from a matching algorithm in accordance with one or more embodiments described herein.

In an example, the machine learning component 602 (or another system component such as the matching component 208) can find all the replicas of a given gate of interest through the use of a matching algorithm based on a CA constellation. For example, FIG. 7A illustrates an example, non-limiting schematic representation 700 of replicas of a small inverter determined from a matching algorithm based on the CA constellation in accordance with one or more embodiments described herein. FIG. 7B illustrates an example, non-limiting schematic representation 702 of replicas of a larger NOR gate determined from a matching algorithm based on the CA constellation in accordance with one or more embodiments described herein. FIG. 7C illustrates an example, non-limiting schematic representation 704 of replicas of a complex macro determined from a matching algorithm based on the CA constellation in accordance with one or more embodiments described herein. As illustrated in FIGS. 7A, 7B, and 7C, the one or more replicas can be identified throughout the entire cell.

Figures 8A, 8B, 8C:
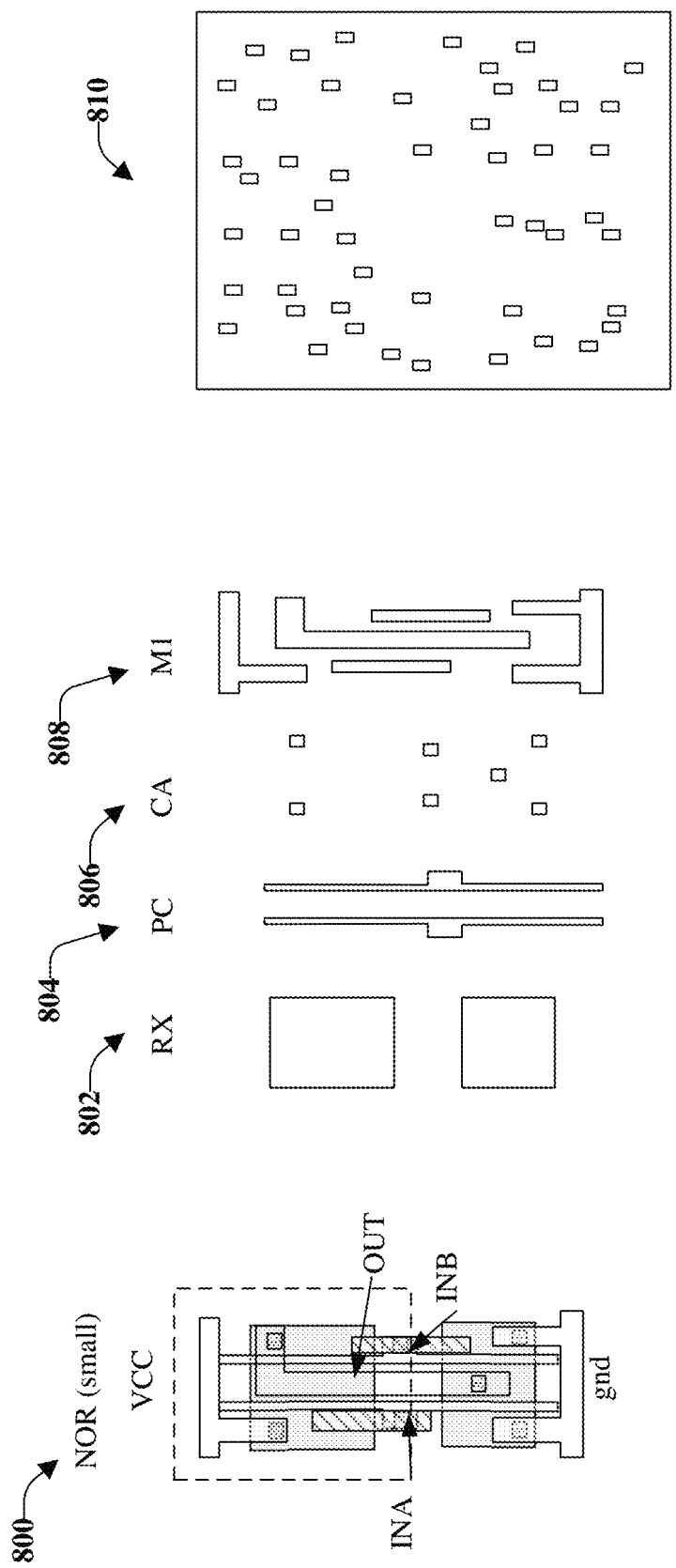
FIG. 8A illustrates an example, non-limiting gate in accordance with one or more embodiments described herein.
FIG. 8B illustrates the gate of FIG. 8A decomposed into several material and manufacturing layers in accordance with one or more embodiments described herein.
FIG. 8C illustrates the gate of FIG. 8A with pattern matching algorithms applied in accordance with one or more embodiments described herein.

For example, FIG. 8A illustrates an example, non-limiting NOR gate 800, which is composed of several material and manufacturing layers including a diffusion (RX) layers 802, a gate (PC) layer 804, a contact (CA) layer 806, a M1 interconnect layer 808, and so on, as illustrated in FIG. 8B in accordance with one or more embodiments described herein. As illustrated in FIG. 8C, the shape and size of the layers can be used in pattern matching algorithms to identify all the replicas/copies of such gate inside a given layout 810. In some implementations, the replicas/copies can be determined across multiples layouts.

According to some implementations, the CA layer 806 can be a unique identifier of the gate and therefore can be used alone to uniquely identify one or more copies of a given cell (e.g., via the matching component 208). The CA layer 806 can be useful when it is generated from the physical reverse engineering of a chip using, for example, SEM, TEM, and/or Backscattered Electrons (BSE) techniques since CA contacts are usually made of high atomic number metals (e.g., Tungsten, W) that provide a strong contrast in the image, thus making the identification of CAs and constellations of CAs relatively easy.

With continuing reference to FIG. 6, according to some implementations, a given gate can be analyzed, one or more layers identifying the gate can be extracted (e.g., the CA layer), and a pattern matching algorithm can be used to identify all the locations inside the unknown layout that provides a match against the selected layer. Referring to the particular use of CAs, a matching can be based on the number and size of common CA besides the known gate and unknown layout location. Once all the matching locations have been found, a number of copies and list of positions can be generated and recorded (or stored), such as in a database 604 for later use and analysis.

According to some implementations, a modification component 606 can determine if a non-material alteration has been made to the gate. For example, a given gate can undergo common linear transformations (such as flipping and rotation) so those conditions should be considered in the matching methodology. In addition, the modification component 606 can identify changes to a size of a gate. The modification component 606 can retain this information in the database 604 for historical analysis.

Additionally, the non-limiting system 600 can include a sequence component 608 that can construct a gate mapping sequence. The mapping sequence can utilize a similar concept as a genetic mapping. For example, the sequence component 608 can utilize the type and number of gates of a given design (or macro) to create the gate mapping sequence. The information used for the mapping sequence can be derived directly from the GDSII when labels are available or the reverse engineering described above could be utilized. Similarities and differences between the gate mapping sequence of macros and layouts can be used to infer relationships and assist with reverse engineering the IP of the secure chip.

Figure 9:
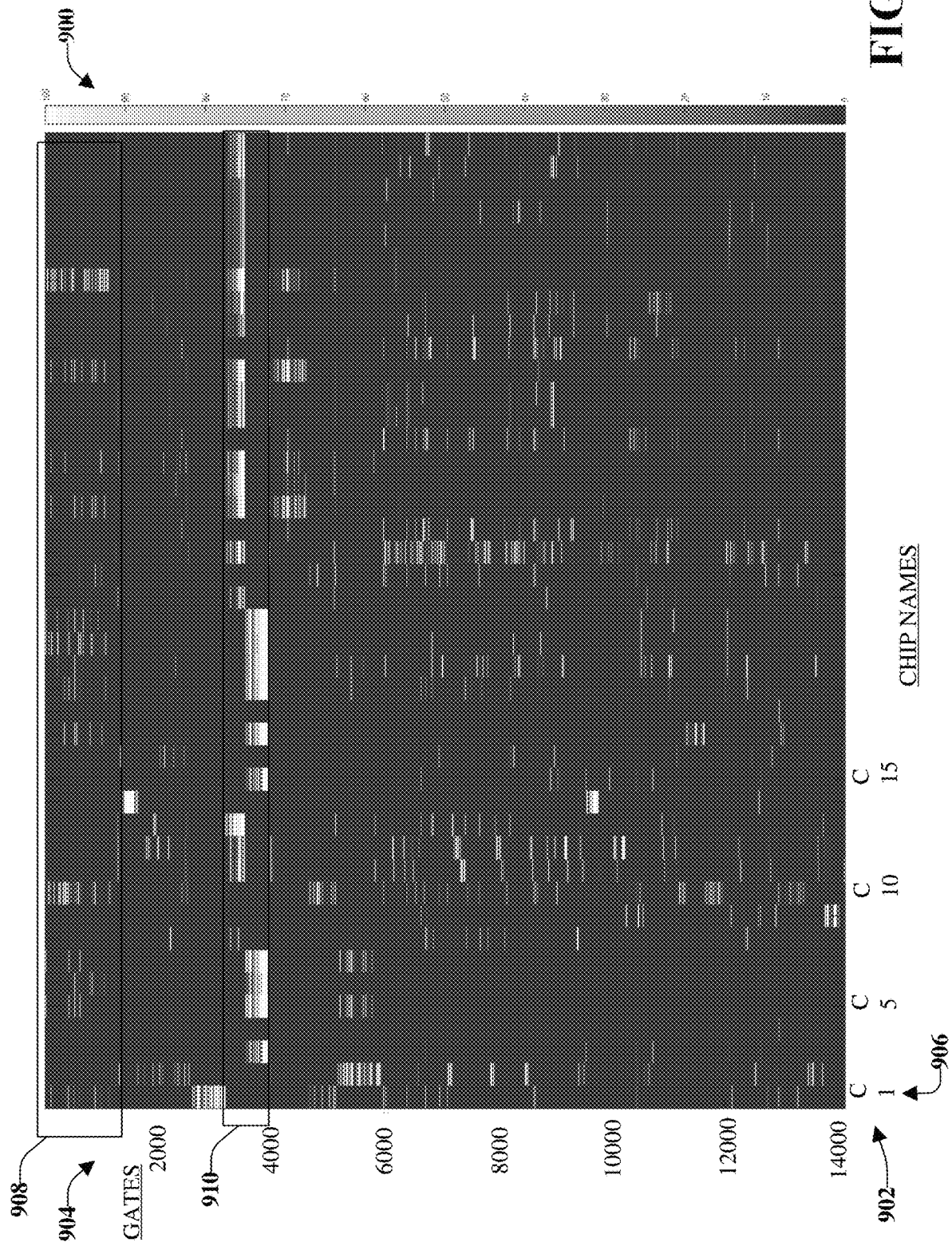
FIG. 9 illustrates an example, non-liming mapping sequence of files analyzed in accordance with one or more embodiments provided herein.

FIG. 9 illustrates an example, non-liming mapping sequence 900 of GDSII files analyzed in accordance with one or more embodiments provided herein. For example, an entire chip can be divided into elementary pieces and a determination as the number of the various gates can be made. A column in FIG. 9 corresponds to a chip. For example, the horizontal axis 902 includes names of different chips (e.g., GDSII layout). Thus, the one or more columns correspond to respective chips. Further, the vertical axis 904 includes a list of gates or gate identifiers.

The hue in a column provides an indication of how many gates of the named type are in the chip. For example, for the first chip 906 ("C1"), there are a large quantity of gates in the 3000 range (e.g., between 2000 and 4000 along the horizontal axis 902). In this example, the different hues (or image intensity) represent a different number of replica of the same gate type. The first box 908 and the second box 910 indicate that multiple chips can have the same gate in common.

Figure 10:
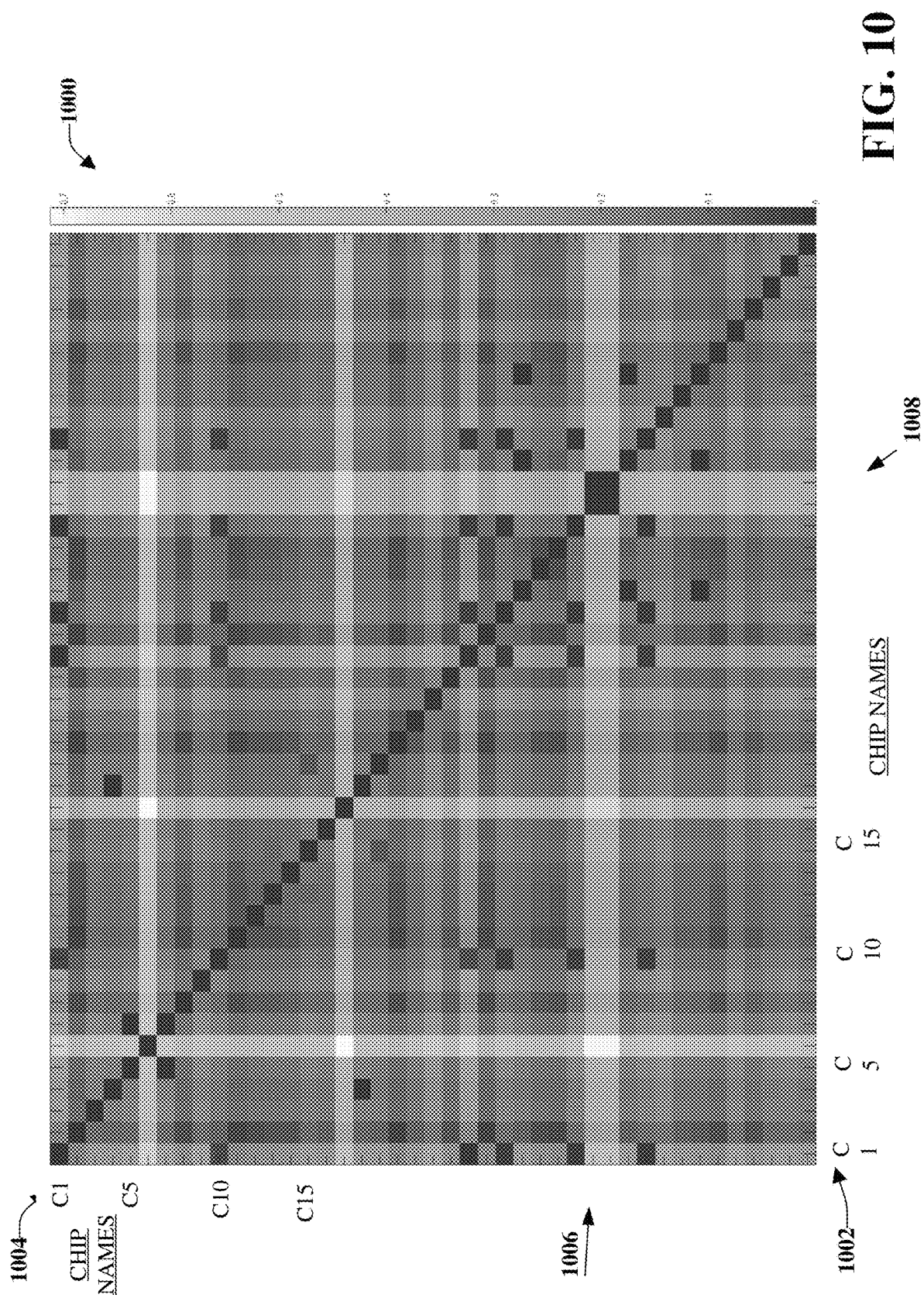
FIG. 10 illustrates an example, non-limiting correlation matrix of gate mapping in accordance with one or more embodiments provided herein.

FIG. 10 illustrates an example, non-limiting correlation matrix 1000 of gate mapping in accordance with one or more embodiments provided herein. In this example, I/Os have been excluded. The correlation matrix 1000 or map illustrates the correlation existing between the mapping of different chips. The vertical axis 1002 and horizontal axis 1004 represent chips. The intersects are measures of the difference in correlation between the two chips. The diagonal has zero differences, since it represents a chip being correlated against itself. Accordingly, the diagonal is dark in hue for the illustrated example. It is noted that in FIG. 10, a dark hue indicates less differences and therefore a stronger correlation. Thus, a lighter hue indicates more differences. However, according to some implementations, a dark hue could indicate more differences and a light hue could indicate less differences. As illustrated, chip 1006 and chip 1008 are correlated, meaning there are little (if any) differences between the chips.

Figure 11:
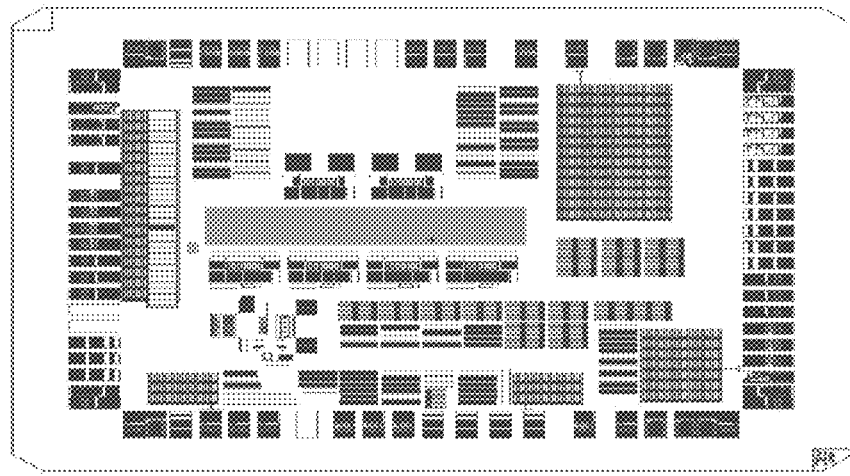
FIG. 11 illustrates similarities between two chips of FIG. 10 in accordance with one or more embodiments provided herein.
Figure 11:
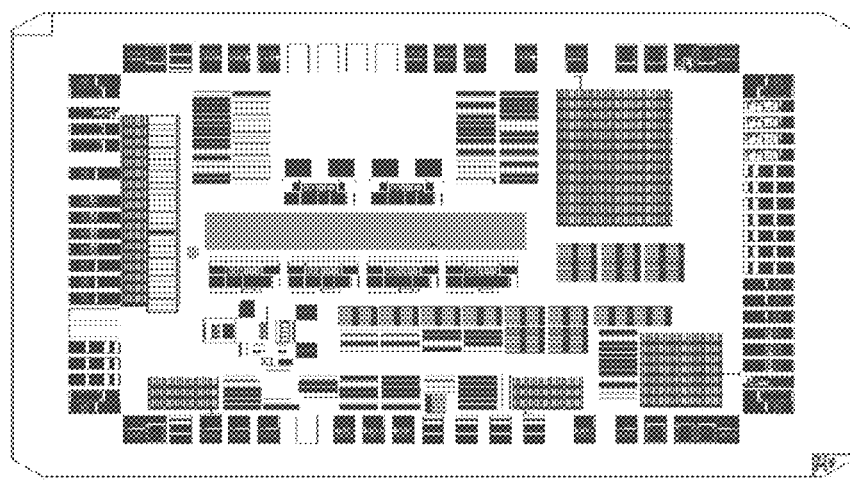

For simplicity, in the examples of FIG. 10, the presence of labels inside the GDSII files are utilized. This technique can be used effectively to identify potential layouts coming from the same designer or origin. For example, FIG. 11 illustrates the two example chip layouts (e.g., chip 1006 and chip 1008 of FIG. 10) for comparison. FIG. 11 illustrates that the layout of chip 1006 is very similar to the layout of chip 1008, as highlighted by their strong gate mapping correlation in FIG. 10. As illustrated in FIG. 11, comparison based on the mapping sequencing can be effective for determining commonalities between chips. Further, an adversary (e.g., competitor) or others can leverage this commonality to improve a reverse engineering process.

Figure 12:
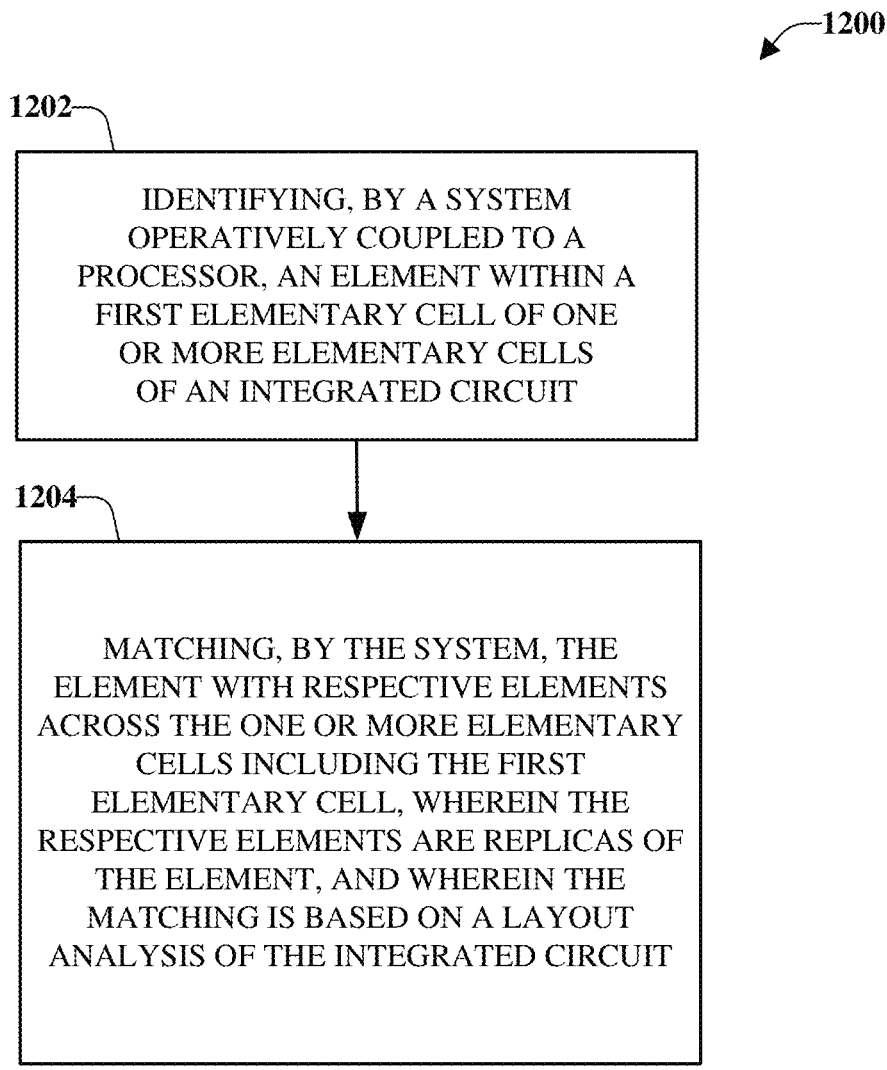
FIG. 12 illustrates a flow diagram of an example, non-limiting computer-implemented method that facilitates integrated circuit identification in accordance with one or more embodiments described herein.

FIG. 12 illustrates a flow diagram of an example, non-limiting computer-implemented method 1200 that facilitates chip identification in accordance with one or more embodiments described herein.

At 1202, a system operatively coupled to one or more processors, can identify an element within a first elementary cell of one or more elementary cells of an integrated circuit (e.g., via the reconstruction component 206). According to the implementation, the element can be a gate. According to an implementation, prior to identifying the element, the non-limiting computer-implemented method 1200 can include dividing, by the system, the integrated circuit into the one or more elementary cells, wherein the dividing comprises employing a topological characteristic of the integrated circuit. The topological characteristic can be selected from a group consisting of a space separation, an absence of interconnections, and a repetition of a structure of the integrated circuit.

At 1204, the system can match the element with respective elements across the one or more elementary cells including the first elementary cell (e.g., via the matching component 208). The respective elements are replicas of the element, and the matching can be based on a layout analysis of the integrated circuit. In an example, the method can also include identifying, by the system, one or more circuit blocks within the integrated circuit based on a feature of the integrated circuit. The feature can be selected from a group consisting of symmetry, isolation, degree of organization, and a repetition of the one or more circuit blocks within the integrated circuit.

Figure 13A:
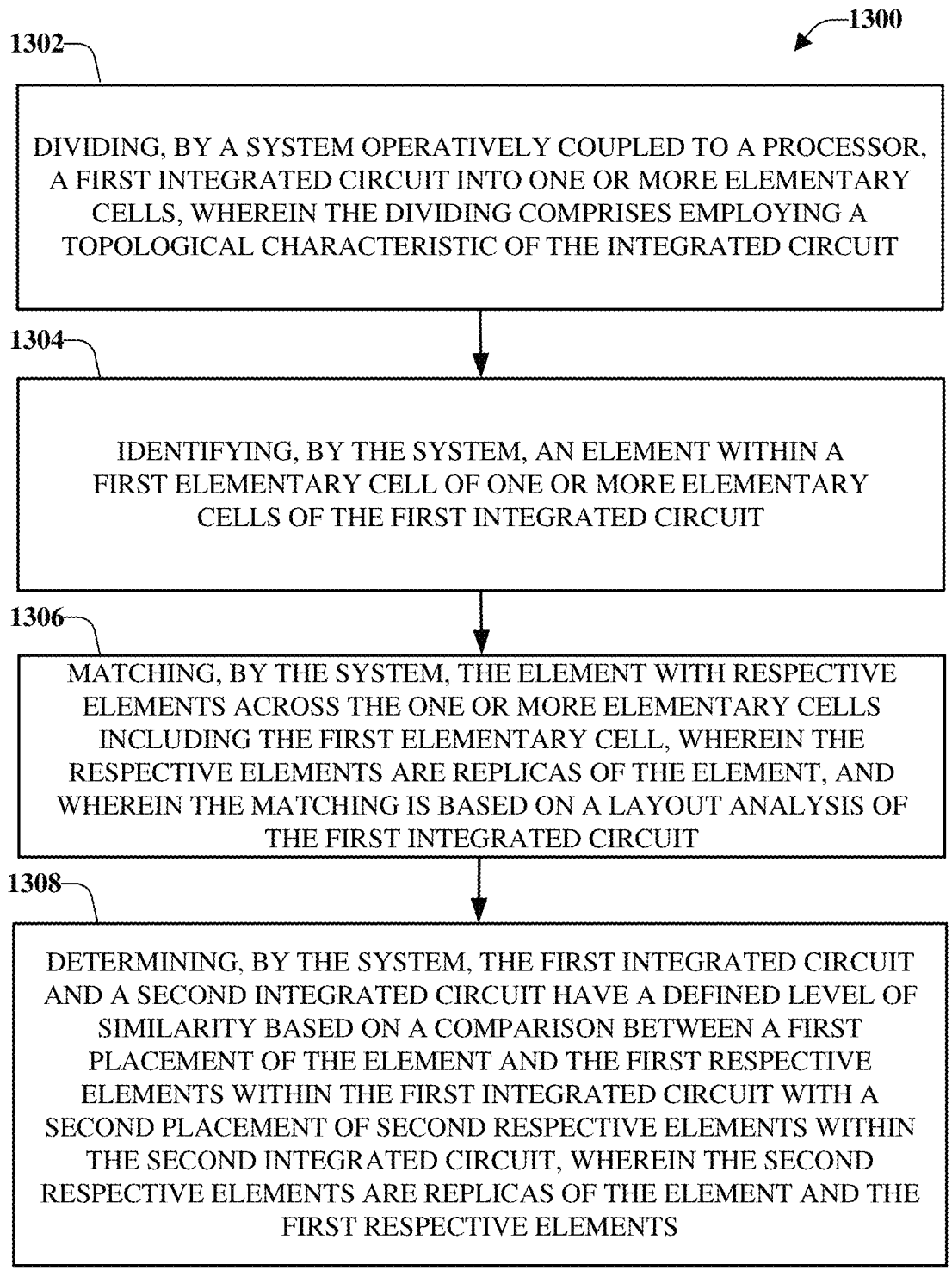
FIG. 13A illustrates a flow diagram of an example, non-limiting computer-implemented method that facilitates integrated circuit identification and reverse engineering in accordance with one or more embodiments described herein.

FIG. 13A illustrates a flow diagram of an example, non-limiting computer-implemented method 1300 that facilitates chip identification and reverse engineering in accordance with one or more embodiments described herein.

At 1302, a system operatively coupled to one or more processors, can divide an integrated circuit into the one or more elementary cells (e.g., via the parse component 204). Dividing the integrated circuit can include employing a topological characteristic of the integrated circuit.

An element within a first elementary cell of one or more elementary cells of an integrated circuit can be identified, at 1304 (e.g., via the reconstruction component 206). Further, at 1306, the element can be matched with respective elements across the one or more elementary cells including the first elementary cell. The respective elements are replicas of the element. Further, the matching can be based on a layout analysis of the integrated circuit.

According to an implementation, at 1308, the method can include determining, by the system, the first integrated circuit and a second integrated circuit have a defined level of similarity. The determination can be based on a comparison between a first placement of the element and the respective elements within the first integrated circuit with a second placement of second respective elements within the second integrated circuit (e.g., via the matching component 208). The second respective elements are replicas of the element and the first respective elements.

Figure 13B:
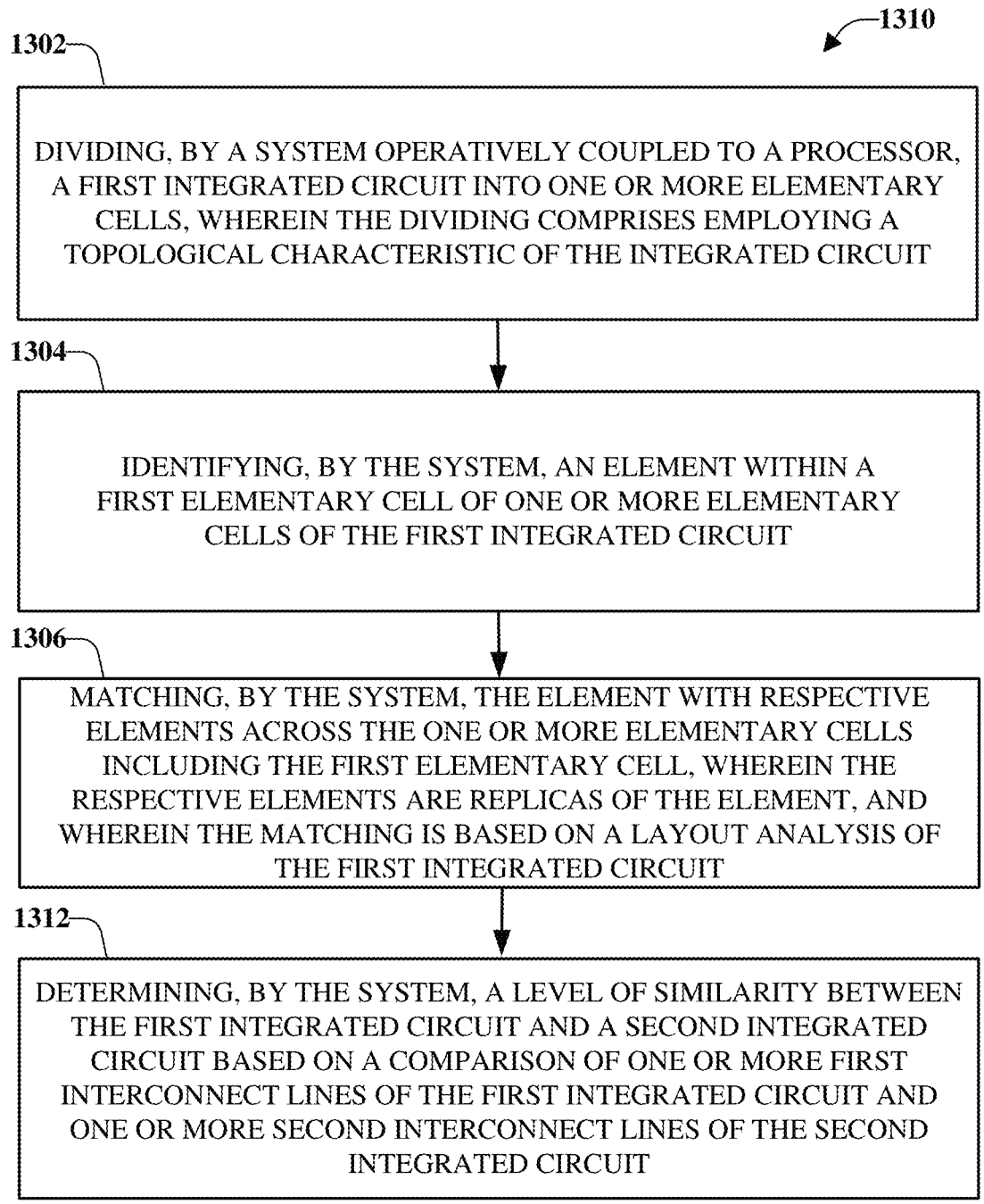
FIG. 13B illustrates a flow diagram of an alternative example, non-limiting computer-implemented method that facilitates integrated circuit identification and reverse engineering in accordance with one or more embodiments described herein.

FIG. 13B illustrates a flow diagram of an alternative example, non-limiting computer-implemented method 1310 that facilitates integrated circuit identification and reverse engineering in accordance with one or more embodiments described herein. Repetitive description of like elements employed in other embodiments described herein is omitted for sake of brevity.

In this alternative implementation, the non-limiting computer-implemented method 1310 can include, at 1312, determining, by the system, a level of similarity between the first integrated circuit and a second integrated circuit. The level of similarity can be determined based on a comparison of one or more first interconnect lines of the first integrated circuit and one or more second interconnect lines of the second integrated circuit (e.g., via the sequence component 608). Further to this implementation, the method can include measuring a quantity of the one or more first interconnect lines that overlap the one or more second interconnect lines based on the first integrated circuit being overlaid on the second integrated circuit.

With reference to both FIGS. 13A and 13B according to some implementations, the element can be a first element and the respective elements can be respective first elements. The computer-implemented method can further comprise identifying, by the system, a second element within the first elementary cell, wherein the first element and the second element are different elements. Further to this implementation, the method can comprise matching, by the system, the second element to respective second elements across the one or more elementary cells. The respective second elements can be replicas of the second element.

In an implementation, the element can be a first element and the respective elements can be respective first elements, and the computer-implemented method can also include identifying, by the system, a second element within the first elementary cell and matching, by the system, the second element to respective second elements within a second elementary cell of the one or more elementary cells. Further to this implementation, the method can include associating, by the system, the first element and the respective first elements with a first identifier and associating, by the system, the second element and the respective second elements with a second identifier.

Figure 14:
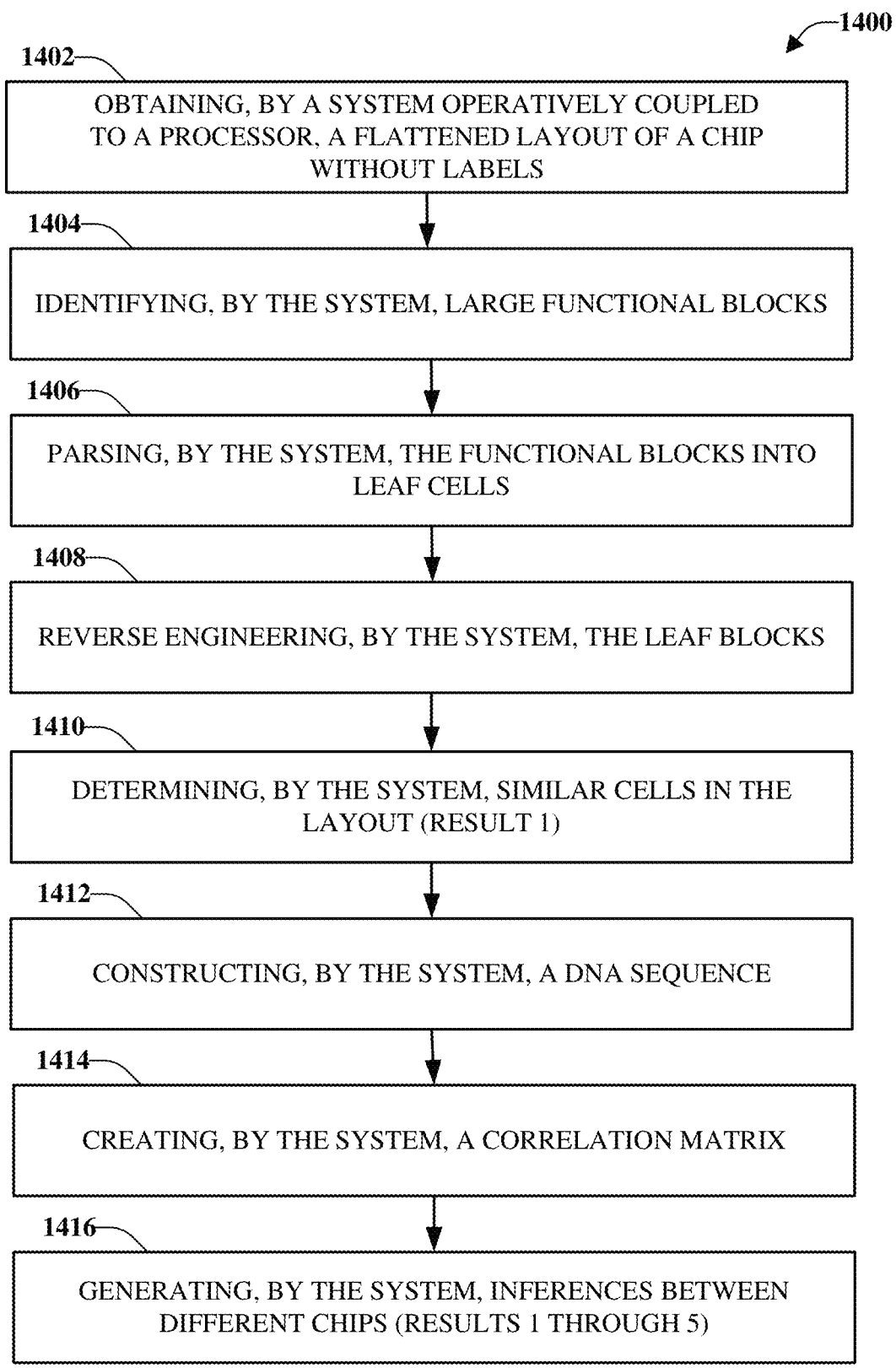
FIG. 14 illustrates a flow diagram of an example, non-limiting computer-implemented method that facilitates integrated circuit identification and reverse engineering in accordance with one or more embodiments described herein.

FIG. 14 illustrates a flow diagram of an example, non-limiting computer-implemented method 1400 that facilitates chip identification and reverse engineering in accordance with one or more embodiments described herein.

At 1402, a system operatively coupled to a processor can obtain a flattened layout of a chip (e.g., via the processing component 104), wherein the flattened layout does not include labels. For example, the flattened layout can be obtained from a layout database and/or based on polygons from physical reverse engineering (e.g., SEM, TEM, Xray images). Based on the flattened layout, at 1404, the system can identify large functional blocks/structures of the chip (e.g., via the evaluation component 202). The large functional blocks can be high-level circuit blocks including I/Os and memories. According to some implementations, the large functional blocks can be identified based on key features, such as isolation, symmetry, high degree or organization, and/or repetitions.

At 1406, the system can separate the functional blocks into leaf cells or elementary cells (e.g., via the parse component 204). To separate the functional blocks, topological characteristics of the available layers can be leveraged or utilized. The topological characteristics can include space separation, absence of interconnections, repetition of structure, proximity, spacing, and/or filler gates observed in a topological layout of the chip. Based on the functional blocks, at 1408, the system can reverse engineer the leaf blocks into leaf cells (e.g., via the reconstruction component 206). For example, meaningful labels can be associated with the leaf cells. Labels can include, but are not limited to, NOR1, AND2, NOT, NAND2, NAND3, NOR, and so on.

Similar cells in the layout can be determined by the system at 1410 (e.g., via the matching component 208). According to an implementation, the similar cells can be determined based on using feature matching that is based on CA constellation. For example, a cell A can be matched to a cell B and an evaluation can be performed to determine if cell A and cell B are an identical match based on the comparison of their CA constellation (e.g., size and relative spatial position of the CA contacts). An amount of overlapping CAs can be used to measure the similarity between the two cells. Cell A and cell B can be identical if all the CA of cell A match in size and relative position the CA of cell B (including linear transformations of cell B versus cell A, such as horizontal/vertical flips and rotations).

Based on the determination of the similar cells, a first result (result 1), which is a gate level reverse engineering, can be obtained and output. In an example, determining similar cells in the layout can include localization of all the replicas of such structures across the functional block and/or chips so that the number of replicas is known.

The method can continue, at 1412, when a gate mapping sequence can be constructed (e.g., via the sequence component 608). For example, the mapping sequence can be a representation of a chip and a macro consisting of a list and quantity of constituent elementary cells (leaf cells). Similarities and differences between the type of gates and the number of gates can be used to evaluate if two or more designs, layouts, and/or macros are similar, identical, or different. Further, a graphical/visual representation of the mapping sequence can be generated. In the representation, the one or more gate identifiers (IDs)/quality pair can be represented as a set of lines or marks of different hues along a line indicating different gates ID and where hue or level of brightness can represent the number of gates of a given type in a linear or logarithmic scale. An example, non-limiting representation of a mapping sequence is illustrated in FIG. 10.

According to some implementations, at 1414, a correlation matrix can be created (e.g., via the sequence component 608). The correlation matrix can be utilized to evaluate if two or more chips have similar elements and/or sub-circuits in common. In an example, a gate mapping sequence of chip/macro A can be compared to the gate mapping sequence of chip/macro B. The comparison can be made by determining a weighted difference and/or calculating a cross correlation. Based on the comparison, a measure of the correlation can be computed. For example, the measurement can be determined by calculating the sum of the differences. The measure of difference can be used to decide if the chip A, or a portion of chip A, is similar, identical, and/or different to chip B, or a portion of chip B.

At 1416, the system can create one or more inferences between different chips (e.g., via the sequence component 608). Based on the one or more inferences, various results (e.g., results 2 through 5) can be obtained and output. A result (result 2) can be identification of a similar design. Another result (result 3) can be identification of a similar source, such as a design house or designer. Another result (result 4) can be identification of similar sub-blocks. Yet another result (result 5) can be an identification of circuit alterations.

Figure 15:
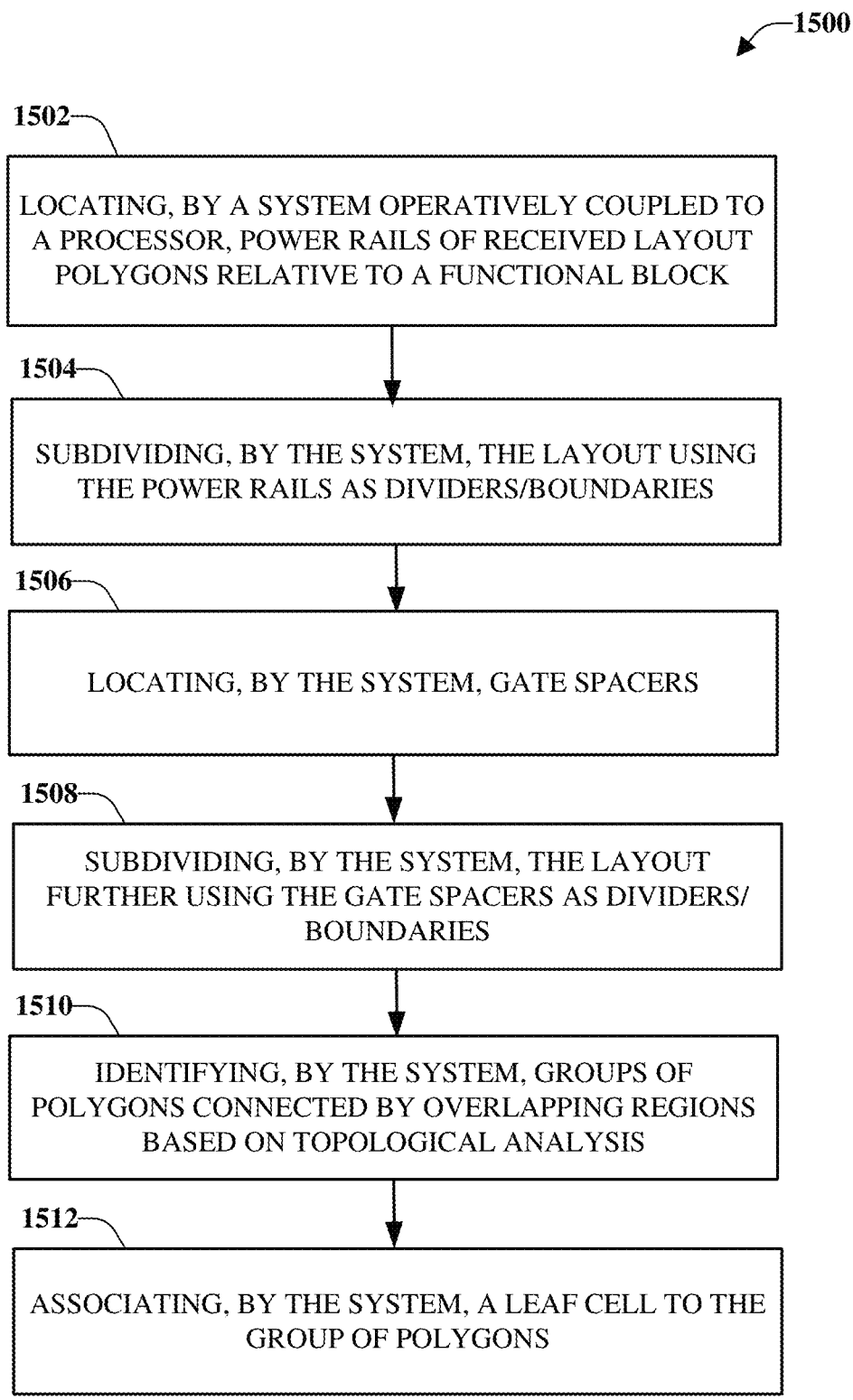
FIG. 15 illustrates a flow diagram of an example, non-limiting computer-implemented method that facilitates dividing an integrated circuit layout into elementary cells in accordance with one or more embodiments described herein.

FIG. 15 illustrates a flow diagram of an example, non-limiting computer-implemented method 1500 that facilitates dividing a chip layout into elementary cells (or leaf cells) in accordance with one or more embodiments described herein.

At 1502, a system operatively coupled to a processor can locate power rails based on a received layout of polygons relative to a functional block (e.g., via the evaluation component 202). In an example, power rail information can be received in order to locate the power rails. According to some implementations, the power rails can be identified based on spacing, proximity, or other topological features.

The chip layout can be subdivided, at 1504, using the power rails as dividers and/or boundaries (e.g., via the parse component 204). An example of using the power rails in this manner was provided above with respect to FIG. 5B. Gate spacers can be located at 1506 (e.g., via the parse component 204). The gate spacers include areas not used and/or a specific structure that utilize spaces. According to some implementations, to locate the gate spacers, information related to the gate spacers can be received. At 1508, the layout can be further subdivided using the gate spacers as dividers and/or boundaries (e.g., via the parse component 204).

At 1510, topological analysis can be performed to identify groups of polygons connected by overlapping regions of RX, PC, CA, M1 (e.g., via the parse component 204). At 1512, a leaf cell can be associated with the group of polygons. After this, the method can proceed with the next group of polygons until all polygons have been evaluated.

Figure 16:
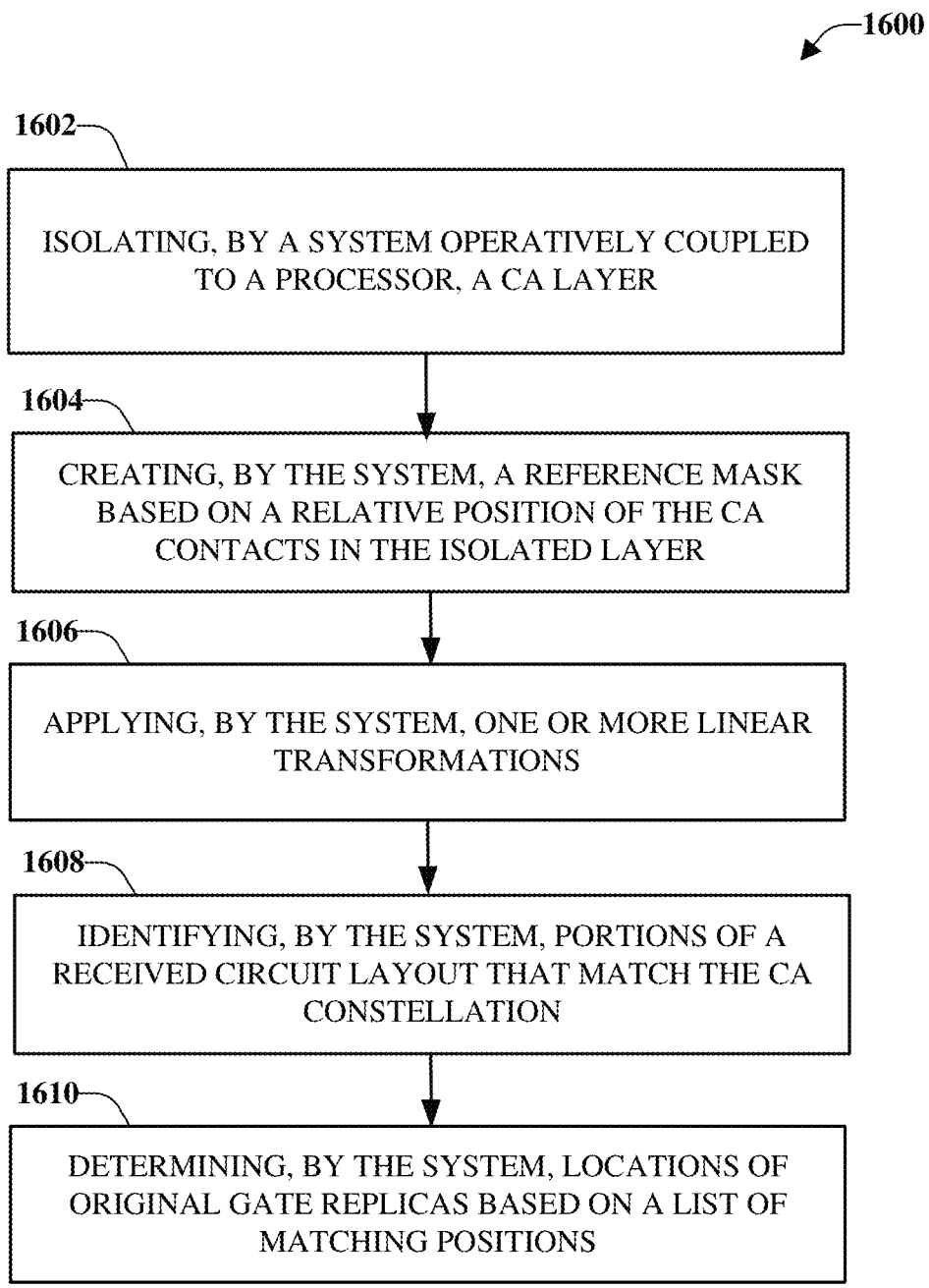
FIG. 16 illustrates a flow diagram of an example, non-limiting computer-implemented method that facilitates using a CA constellation to match two or more cells in accordance with one or more embodiments described herein.

FIG. 16 illustrates a flow diagram of an example, non-limiting computer-implemented method 1600 that facilitates using a CA constellation to match two or more cells in accordance with one or more embodiments described herein. The non-limiting computer-implemented method 1600 starts, at 1602, when a system operatively coupled to a processor can receive a layout of a cell (which has already been broken down into pieces or elementary cells as discussed herein) and isolate or extract a CA layer out of all layers of a cell. At 1604, a reference mask based on the relative position of the CA contacts in the isolated layer (CA constellation) can be created.

At 1606, a linear transformation can be applied. For example, the linear transformation can include flipping, rotating, scaling, and so on. The linear transformation can be applied so that gates that have been flipped, rotated, increased in size, decreased in size, and so on can be matched to other gates.

A layout circuit can be received and, at 1608, a search of the received circuit layout can be executed in order to identify portions that match the CA constellation. According to an implementation, the matching can determine if relative positions of a group of CA in the circuit layout matches the relative positions of the CA in the constellation of the reference gate. At 1610, a list of matching (xi, yi) positions can be obtained. The xi, yi can include information related to a gate that has been flipped, rotated, or another non-material alteration that has been performed. At 1610, the corresponding positions can be returned as the locations of the original gate replicas.

Figure 17A:
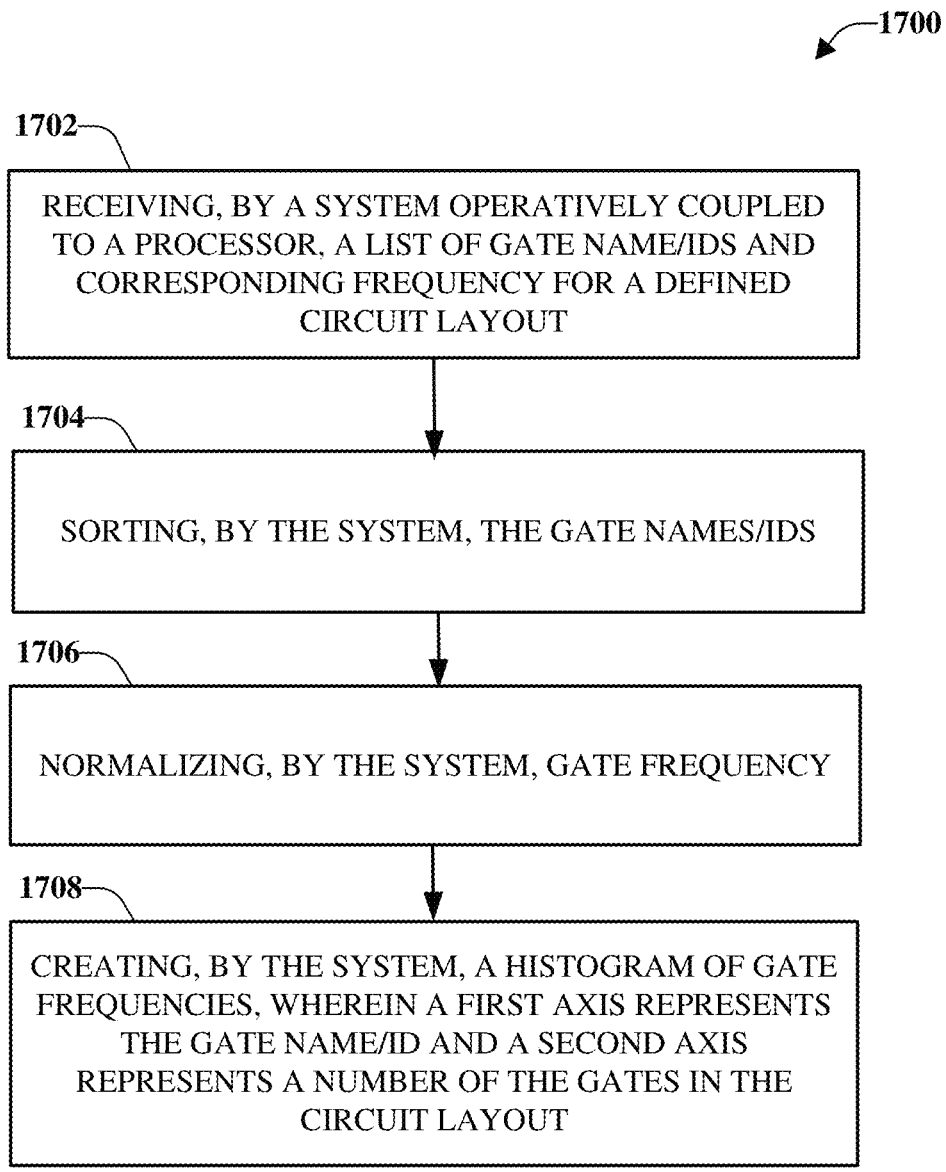
FIG. 17A illustrates a flow diagram of an example, non-limiting computer-implemented method that facilitates creation of a mapping sequence in accordance with one or more embodiments described herein.

FIG. 17A illustrates a flow diagram of an example, non-limiting computer-implemented method 1700 that facilitates creation of a mapping sequence in accordance with one or more embodiments described herein. The non-limiting computer-implemented method 1700 starts, at 1702, when a system operatively coupled to a processor can receive a list of gate names and associated IDs as well as a corresponding number of repetitions (frequency) for a given circuit layout. The gate names/IDs can be sorted, at 1704. For example, the gate names/IDs can be sorted alphabetically, numerically, based on gate size and/or gate area, based on gate frequency, or based on other manners of sorting the gate names/IDs. At 1706, the gate frequency can be normalized. For example, the normalization can be to the total number of gates, to the circuit area, and so on.

According to an implementation, the non-limiting computer-implemented method 1700 continues at 1708 when a histogram of gate frequencies is created. For example, a first axis of the histogram can represent the gate name/ID and a second axis of the histogram can represent the number of such gates in the circuit layout.

Figure 17B:
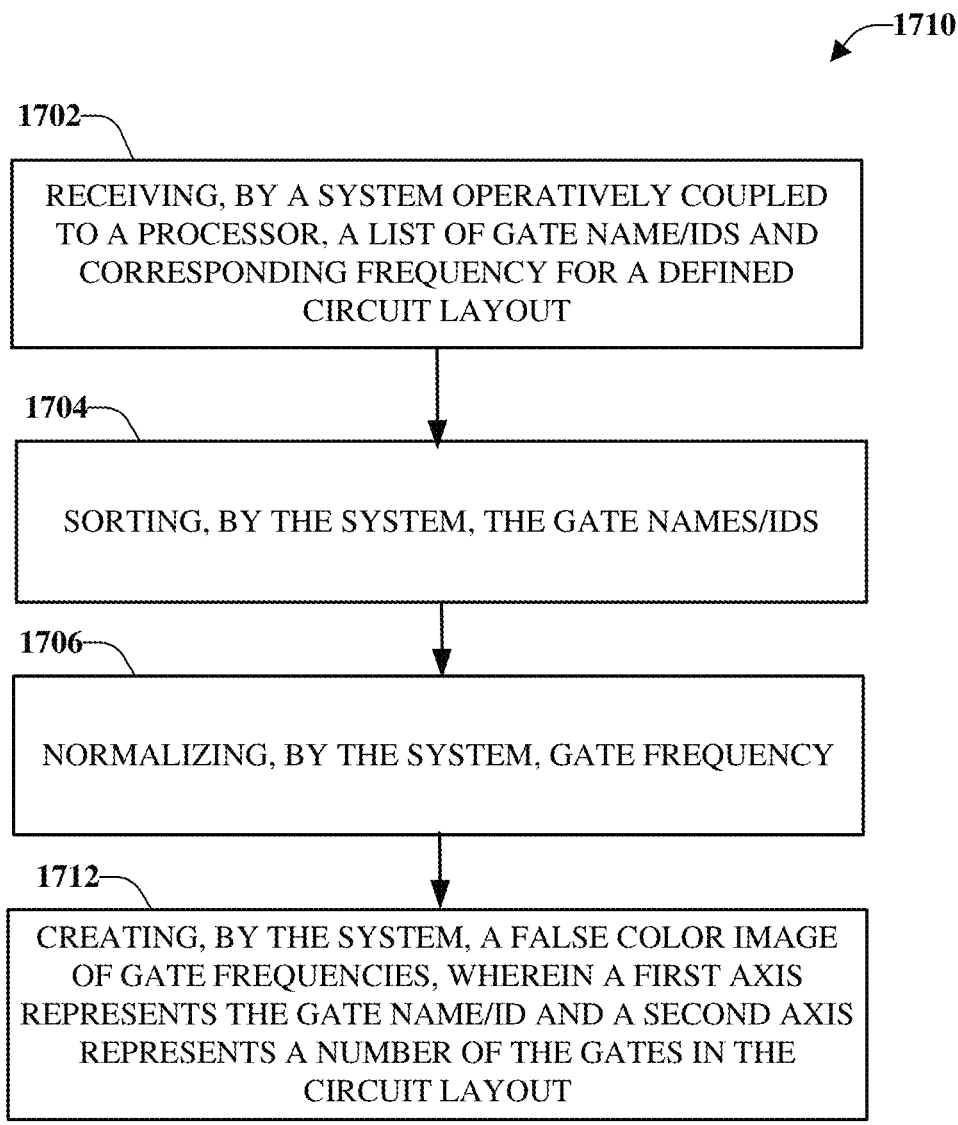
FIG. 17B illustrates a flow diagram of an alternative example, non-limiting computer-implemented method that facilitates creation of a mapping sequence in accordance with one or more embodiments described herein.

FIG. 17B illustrates a flow diagram of an alternative example, non-limiting computer-implemented method 1710 that facilitates creation of a mapping sequence in accordance with one or more embodiments described herein. Repetitive description of like elements employed in other embodiments described herein is omitted for sake of brevity.

In this alternative implementation, the non-limiting computer-implemented method 1710 can include, at 1712, creating a false hue image of gate frequencies represented as histogram. A first axis of the histogram can represent the gate name/ID and a second axis of the histogram can represent the number of such gates in the circuit layout. FIG. 9 illustrates an example, non-limiting histogram according to an implementation.

Figure 18:
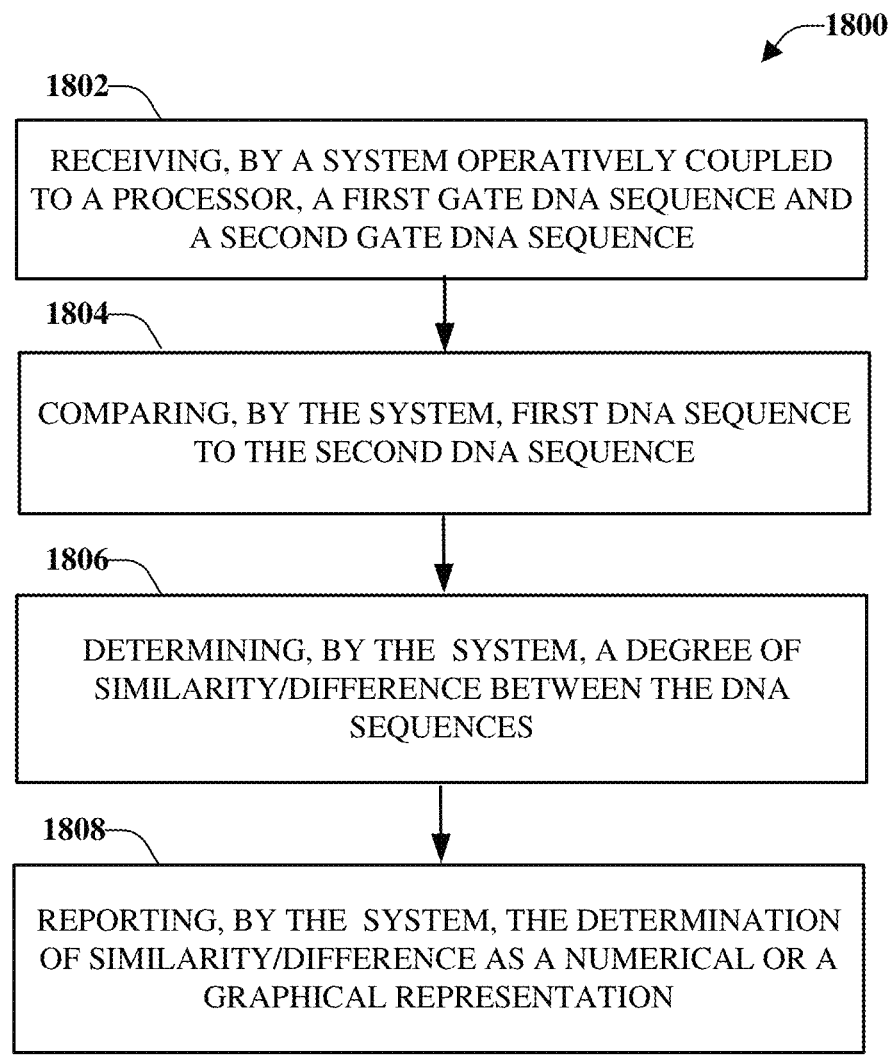
FIG. 18 illustrates a flow diagram of an example, non-limiting computer-implemented method that facilitates creation of a correlation matrix in accordance with one or more embodiments described herein.

FIG. 18 illustrates a flow diagram of an example, non-limiting computer-implemented method 1800 that facilitates creation of a correlation matrix in accordance with one or more embodiments described herein. The non-limiting computer-implemented method 1800 starts, at 1802, when a system operatively coupled to a processor can receive a first gate mapping sequence. At about the same time, or at a different time, the system can receive a second gate mapping sequence, at 1804. According to some implementations, the first mapping sequence and the second mapping sequence can be determined according to the non-limiting computer-implemented method 1700 of FIG. 17A and/or the non-limiting computer-implemented method 1710 of FIG. 17B. At 1806, the first mapping sequence can be compared to the second mapping sequence. For example, the comparison can be made based on a weighted difference. In another example, the comparison can be made based on a cross correlation calculation.

A degree of similarity/difference between the two mapping sequences can be determined at 1808. According to an implementation, the determination of similarity/difference can be achieved by performing a mathematical correlation between the two mapping sequences after padding for missing gates. The higher the correlation the more similar the layouts. In accordance with another implementation, the determination of similarity/difference can be achieved by calculating the absolute number of the difference between sequence and then summing all the values. In this case the lower the difference, the more similar the layouts. At 1810, the determination can be reported as a numerical representation and/or as a graphical representation.

As discussed herein, the various aspects enable chip identification through pattern analysis and inspection of chip layouts without damaging the hardware and without the use of emission tools. Further, the various aspects can enable the chip identification without de-layering the chips. Therefore, the chips remain functional.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 19:
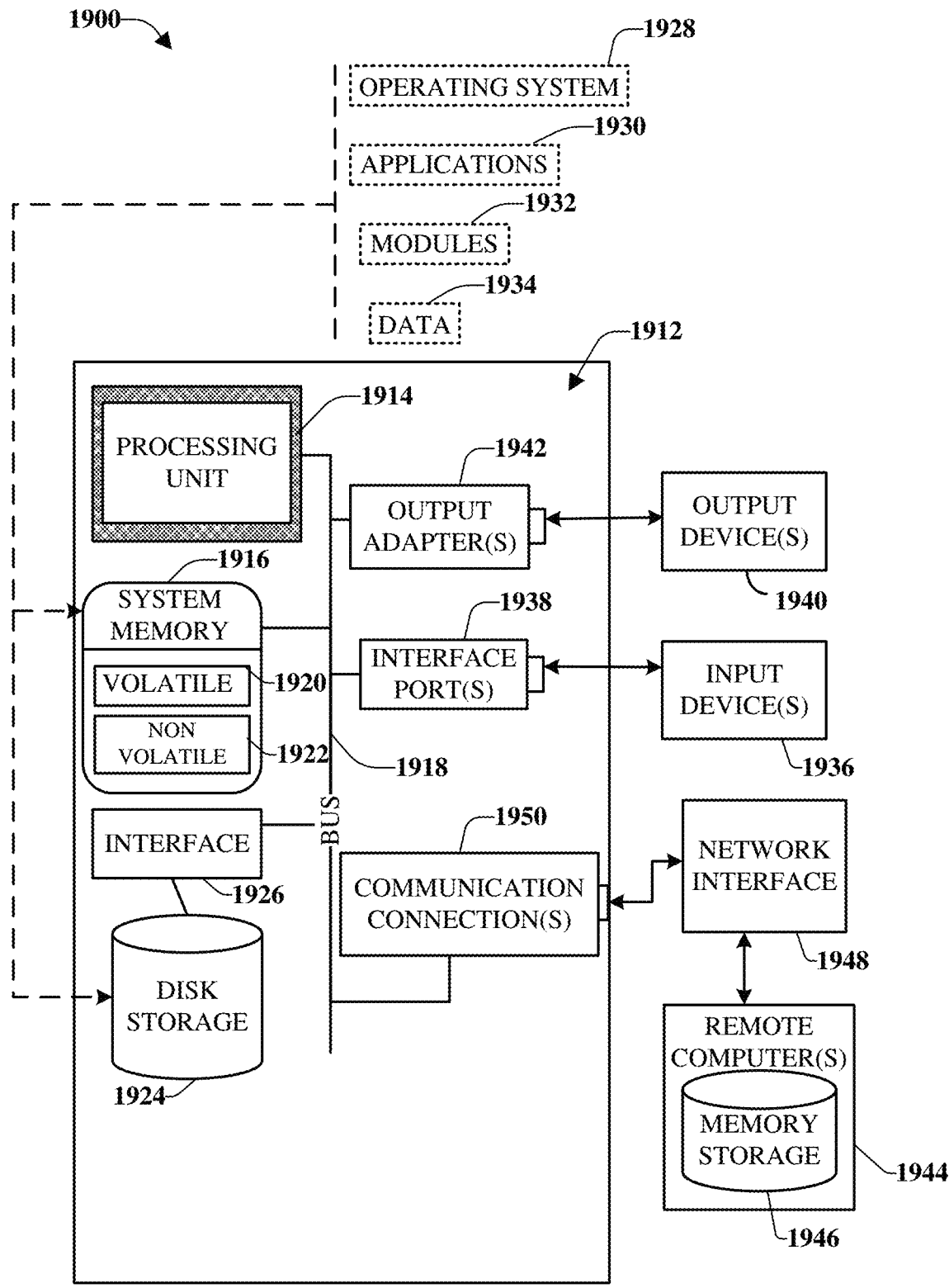
FIG. 19 illustrates a block diagram of an example, non-limiting operating environment in which one or more embodiments described herein can be facilitated.

In order to provide a context for the various aspects of the disclosed subject matter, FIG. 19 as well as the following discussion are intended to provide a general description of a suitable environment in which the various aspects of the disclosed subject matter can be implemented. FIG. 19 illustrates a block diagram of an example, non-limiting operating environment in which one or more embodiments described herein can be facilitated. Repetitive description of like elements employed in other embodiments described herein is omitted for sake of brevity. With reference to FIG. 19, a suitable operating environment 1900 for implementing various aspects of this disclosure can also include a computer 1912. The computer 1912 can also include a processing unit 1914, a system memory 1916, and a system bus 1918. The system bus 1918 couples system components including, but not limited to, the system memory 1916 to the processing unit 1914. The processing unit 1914 can be any of various available processors. Dual microprocessors and other multiprocessor architectures also can be employed as the processing unit 1914. The system bus 1918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1916 can also include volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1912 can also include removable/non-removable, volatile/non-volatile computer storage media. FIG. 19 illustrates, for example, a disk storage 1924. Disk storage 1924 can also include, but is not limited to, devices like a magnetic disk drive, floppy disk drive, tape drive, Jaz drive, Zip drive, LS-100 drive, flash memory card, or memory stick. The disk storage 1924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used, such as interface 1926. FIG. 19 also depicts software that acts as an intermediary between users and the basic computer resources described in the suitable operating environment 1900. Such software can also include, for example, an operating system 1928. Operating system 1928, which can be stored on disk storage 1924, acts to control and allocate resources of the computer 1912. System applications 1930 take advantage of the management of resources by operating system 1928 through program modules 1932 and program data 1934, e.g., stored either in system memory 1916 or on disk storage 1924. It is to be appreciated that this disclosure can be implemented with various operating systems or combinations of operating systems. A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port can be used to provide input to computer 1912, and to output information from computer 1912 to an output device 1940. Output adapter 1942 is provided to illustrate that there are some output devices 1940 like monitors, speakers, and printers, among other output devices 1940, which require special adapters. The output adapters 1942 include, by way of illustration and not limitation, video and sound cards that provide a method of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a computer, a server, a router, a network PC, a workstation, a microprocessor based appliance, a peer device or other common network node and the like, and typically can also include many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1950 refers to the hardware/software employed to connect the network interface 1948 to the system bus 1918. While communication connection 1950 is shown for illustrative clarity inside computer 1912, it can also be external to computer 1912. The hardware/software for connection to the network interface 1948 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    generating, by a system operatively coupled to a processor, for display on an interface, a correlation matrix illustrating a correlation between mappings of a first design layout integrated circuit and a second design layout integrated circuit, wherein intersections with the correlation matrix are displayed as different hues to indicate respective differences in correlations between the first design layout integrated circuit and the second design layout integrated circuit, and wherein display of a hue on a diagonal of the correlation matrix is darker than a defined value to indicate a first level of correlation between the design layout integrated circuit and the second design layout integrated circuit.

2. The computer-implemented method of claim 1, wherein display of the hue on the diagonal of the correlation matrix is lighter than the defined value to indicate a second level of correlation between the design layout integrated circuit and the second design layout integrated circuit.

3. The computer-implemented method of claim 1, further comprising dividing, by the system, the design layout integrated circuit into one or more elementary cells.

4. The computer-implemented method of claim 3, wherein the dividing comprises employing a topological characteristic of the design layout integrated circuit.

5. The computer-implemented method of claim 4, wherein the topological characteristic is selected from a group consisting of a space separation, an absence of interconnections, and a repetition of a structure of the design layout integrated circuit.

6. The computer-implemented method of claim 1, further comprising identifying, by the system, one or more circuit blocks within the design layout integrated circuit based on a feature of the design layout integrated circuit.

7. The computer-implemented method of claim 6, wherein the feature is selected from a group consisting of symmetry, isolation, degree of organization, and a repetition of the one or more circuit blocks within the design layout integrated circuit.

8. The computer-implemented method of claim 3, wherein an element of a first elementary cell of the one or more elementary cells is a first element and the respective elements are respective first elements, and the computer-implemented method further comprises:
   identifying, by the system, a second element within the first elementary cell, wherein the first element and the second element are different elements; and
   matching, by the system, the second element to respective second elements across the one or more elementary cells.

9. The computer-implemented method of claim 8, wherein the respective second elements are replicas of the second element.

10. The computer-implemented method of claim 8, wherein the design layout integrated circuit is a first design layout integrated circuit and the computer-implemented method further comprises:
    determining, by the system, the first design layout integrated circuit and a second design layout integrated circuit have a defined level of similarity based on a comparison between a first placement of the element and first respective elements within the first design layout integrated circuit with a second placement of second respective elements within the second design layout integrated circuit, wherein the second respective elements are replicas of the element and the first respective elements.

11. The computer-implemented method of claim 1, wherein the design layout integrated circuit is a first design layout integrated circuit, and the computer-implemented method further comprises:
    determining, by the system, a level of similarity between the first design layout integrated circuit and a second design layout integrated circuit based on a comparison of one or more first interconnect lines of the first design layout integrated circuit and one or more second interconnect lines of the second design layout integrated circuit.

12. The computer-implemented method of claim 11, further comprises:
    measuring a quantity of the one or more first interconnect lines that overlap the one or more second interconnect lines based on the first design layout integrated circuit being overlaid on the second design layout integrated circuit.

13. A system, comprising:
    a memory that stores computer executable components; and
    a processor that executes the computer executable components stored in the memory, wherein the computer executable components comprise:
       a sequence component that generates, for display on an interface, a correlation matrix illustrating a correlation between mappings of a first design layout integrated circuit and a second design layout integrated circuit, wherein intersections with the correlation matrix are displayed as different hues to indicate respective differences in correlations between the first design layout integrated circuit and the second design layout integrated circuit, and wherein display of a hue on a diagonal of the correlation matrix is darker than a defined value to indicate a first level of correlation between the design layout integrated circuit and the second design layout integrated circuit.

14. The system of claim 13, wherein display of the hue on the diagonal of the correlation matrix is lighter than the defined value to indicate a second level of correlation between the design layout integrated circuit and the second design layout integrated circuit.

15. The system of claim 13, wherein the computer executable components further comprise:
    a parse component that divides the design layout integrated circuit into one or more elementary cells, wherein the division comprises employment of a topological characteristic of the design layout integrated circuit.

16. The system of claim 15, wherein the topological characteristic is selected from a group consisting of a space separation, an absence of interconnections, and a repetition of a structure of the design layout integrated circuit.

17. The system of claim 13, wherein the computer executable components further comprise:
    a reconstruction component that identifies that one or more circuit blocks within the design layout integrated circuit based on a feature of the design layout integrated circuit, wherein the feature is selected from a group consisting of symmetry, isolation, degree of organization, and a repetition of the one or more circuit blocks within the design layout integrated circuit.

18. A computer program product facilitating chip identification, the computer program product comprising a computer readable storage medium having program instructions embodied therewith, the program instructions executable by a processing component to cause the processing component to:
    generate, by the processing component, display on an interface, a correlation matrix illustrating a correlation between mappings of a first design layout integrated circuit and a second design layout integrated circuit, wherein intersections with the correlation matrix are displayed as different hues to indicate respective differences in correlations between the first design layout integrated circuit and the second design layout integrated circuit, and wherein display of a hue on a diagonal of the correlation matrix is darker than a defined value to indicate a first level of correlation between the design layout integrated circuit and the second design layout integrated circuit.

19. The computer program product of claim 18, wherein display of the hue on the diagonal of the correlation matrix is lighter than the defined value to indicate a second level of correlation between the design layout integrated circuit and the second design layout integrated circuit.

20. The computer program product of claim 18, wherein the program instructions are further executable by the processing component to:

divide, by the processing component, the design layout integrated circuit into one or more elementary cells, wherein the division comprises employment of a topological characteristic of the design layout integrated circuit, and wherein the topological characteristic is selected from a group consisting of a space separation, an absence of interconnections, and a repetition of a structure of the design layout integrated circuit.

\* \* \* \* \*